United States Patent
Ohira et al.

(10) Patent No.: US 10,148,923 B2
(45) Date of Patent: Dec. 4, 2018

(54) INFORMATION PROCESSING APPARATUS, INFORMATION PROCESSING METHOD ADJUSTMENT APPARATUS, AND IMAGE DISPLAY SYSTEM TO ADJUST PROJECTION POSITION OF PARALLAX IMAGES

(71) Applicant: SONY CORPORATION, Tokyo (JP)

(72) Inventors: Ryuichiro Ohira, Tokyo (JP); Hiroyuki Inokawa, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/304,122

(22) PCT Filed: Mar. 6, 2015

(86) PCT No.: PCT/JP2015/001227
§ 371 (c)(1),
(2) Date: Oct. 14, 2016

(87) PCT Pub. No.: WO2015/162843
PCT Pub. Date: Oct. 29, 2015

(65) Prior Publication Data
US 2017/0041580 A1 Feb. 9, 2017

(30) Foreign Application Priority Data

Apr. 22, 2014 (JP) ................................. 2014-088514

(51) Int. Cl.
H04N 9/31 (2006.01)
H04N 17/00 (2006.01)
(Continued)

(52) U.S. Cl.
CPC ............. H04N 9/3185 (2013.01); G09G 5/00 (2013.01); G09G 5/38 (2013.01); H04N 9/3147 (2013.01); H04N 9/3191 (2013.01); H04N 17/00 (2013.01)

(58) Field of Classification Search
CPC .. H04N 9/3185; H04N 9/3147; H04N 9/3191; H04N 17/00; G09G 5/00; G09G 5/38
See application file for complete search history.

(56) References Cited

U.S. PATENT DOCUMENTS

| | | | | |
|---|---|---|---|---|
| 6,953,250 B2 * | 10/2005 | Yasumi | ................... | H04N 5/74 345/593 |
| 7,052,142 B2 * | 5/2006 | Gupta | ................... | G03B 21/20 348/E5.137 |

(Continued)

FOREIGN PATENT DOCUMENTS

| | | |
|---|---|---|
| JP | 2007-259189 A | 10/2007 |
| JP | 2011-186110 A | 9/2011 |

(Continued)

OTHER PUBLICATIONS

Extended European Search Report of EP Patent Application No. 15782600.9, dated Nov. 24, 2017, 14 pages.

*Primary Examiner* — Brian P Yenke
(74) *Attorney, Agent, or Firm* — Chip Law Group

(57) ABSTRACT

An information processing apparatus includes an acquisition unit acquiring output values of a plurality of pixels from an image sensor, the plurality of pixels having a predetermined pixel size, a projection control unit projecting a first pattern image and a second pattern image with a distance smaller than the predetermined pixel size, the first pattern image including one or more boundaries, the second pattern image including one or more corresponding boundaries corresponding to the one or more boundaries, a storage unit storing as, a reference value, an output value of one or more (Continued)

reference pixels, the output value picks up the first pattern image, and an adjusting unit adjusting the projection position by comparing an output value of the one or more reference pixels and the stored reference value, the output value of the one or more reference pixels picks up the second pattern image while moving the projection position.

9 Claims, 17 Drawing Sheets

(51) Int. Cl.
  *G09G 5/00* (2006.01)
  *G09G 5/38* (2006.01)

(56) References Cited

U.S. PATENT DOCUMENTS

| | | | | |
|---|---|---|---|---|
| 7,237,911 | B2* | 7/2007 | Yamada | G03B 21/56 348/383 |
| 7,293,883 | B2* | 11/2007 | Miyasaka | H04N 9/317 348/E9.027 |
| 7,309,133 | B2* | 12/2007 | Miyasaka | G03B 21/005 353/122 |
| 7,629,945 | B2* | 12/2009 | Baudisch | G06F 3/1438 345/1.3 |
| 7,724,206 | B2* | 5/2010 | Saito | H04N 9/3147 345/1.3 |
| 7,857,464 | B2* | 12/2010 | Saito | G03B 21/14 348/744 |
| 8,055,101 | B2* | 11/2011 | Intwala | G06T 7/32 345/613 |
| 8,866,902 | B2* | 10/2014 | Furui | G03B 21/14 348/135 |
| 8,963,941 | B2* | 2/2015 | Aragaki | G02B 27/1046 345/547 |
| 9,426,436 | B2* | 8/2016 | Nakashin | H04N 9/3194 |
| 9,532,018 | B2* | 12/2016 | Ishikawa | G06T 3/005 |
| 9,578,295 | B1* | 2/2017 | Morrison | H04N 9/3185 |
| 9,595,243 | B2* | 3/2017 | Oyama | G09G 5/38 |
| 2004/0085256 | A1 | 5/2004 | Hereld et al. | |
| 2005/0207027 | A1* | 9/2005 | Miyasaka | H04N 9/317 359/696 |
| 2005/0270499 | A1* | 12/2005 | Ishii | G03B 21/14 353/94 |
| 2005/0286026 | A1* | 12/2005 | Matsumoto | G02B 7/36 353/101 |
| 2006/0290890 | A1* | 12/2006 | Saito | G03B 21/14 353/30 |
| 2007/0097334 | A1* | 5/2007 | Damera-Venkata | H04N 9/3147 353/94 |
| 2007/0171380 | A1 | 7/2007 | Wright et al. | |
| 2008/0174516 | A1* | 7/2008 | Xiao | H04N 9/3147 345/1.3 |
| 2009/0066723 | A1* | 3/2009 | Saito | H04N 9/3194 345/629 |
| 2011/0211065 | A1* | 9/2011 | Furui | G03B 21/14 348/135 |
| 2011/0234650 | A1* | 9/2011 | Watanabe | G09G 3/003 345/690 |
| 2011/0234920 | A1* | 9/2011 | Nelson | H04N 9/3147 348/745 |
| 2013/0169888 | A1* | 7/2013 | Tannhauser | H04N 9/3188 348/745 |
| 2013/0222776 | A1* | 8/2013 | Ishikawa | H04N 9/3185 353/121 |
| 2014/0176730 | A1* | 6/2014 | Kaji | H04N 9/3185 348/189 |
| 2014/0268065 | A1* | 9/2014 | Ishikawa | G03B 41/00 353/30 |
| 2014/0327604 | A1* | 11/2014 | Oyama | G02B 27/0068 345/8 |
| 2015/0029465 | A1* | 1/2015 | Ishikawa | G06T 3/005 353/30 |
| 2015/0077573 | A1* | 3/2015 | Ishikawa | G06T 3/005 348/189 |
| 2015/0103257 | A1* | 4/2015 | Nakashin | H04N 9/3185 348/746 |
| 2015/0116582 | A1* | 4/2015 | Yoshikawa | H04N 5/2353 348/362 |
| 2015/0213584 | A1* | 7/2015 | Ishikawa | G06F 3/1446 345/637 |
| 2015/0219983 | A1* | 8/2015 | Mashitani | G03B 21/142 353/31 |
| 2016/0165198 | A1* | 6/2016 | Ouchi | H04N 9/3182 348/744 |
| 2016/0309129 | A1* | 10/2016 | Ohsawa | H04N 9/3191 |
| 2016/0353068 | A1* | 12/2016 | Ishikawa | H04N 9/3147 |
| 2018/0020146 | A1* | 1/2018 | Yoshikawa | H04N 5/2353 |
| 2018/0176523 | A1* | 6/2018 | Takasu | H04N 9/3194 |

FOREIGN PATENT DOCUMENTS

| | | |
|---|---|---|
| JP | 2013-145949 A | 7/2013 |
| JP | 2013-243515 A | 12/2013 |
| JP | 2014-010264 A | 1/2014 |

* cited by examiner

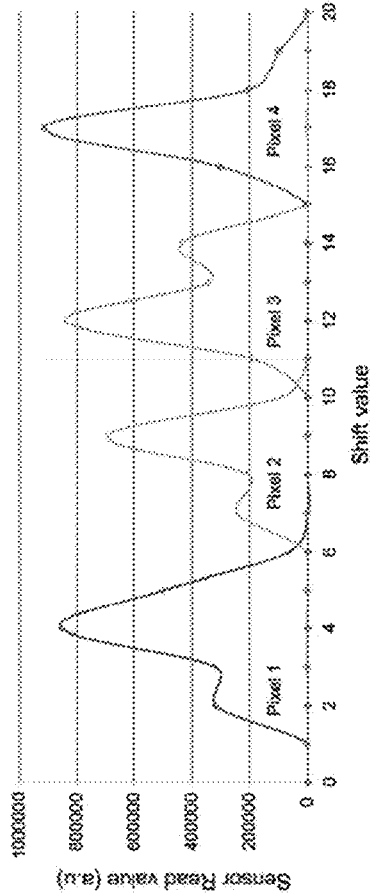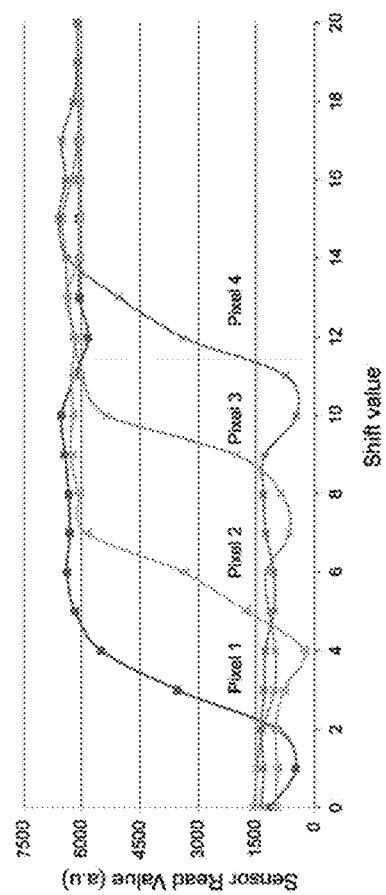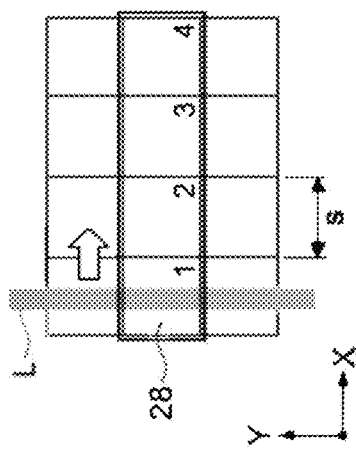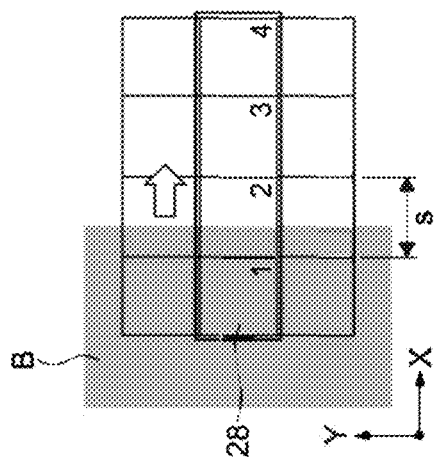

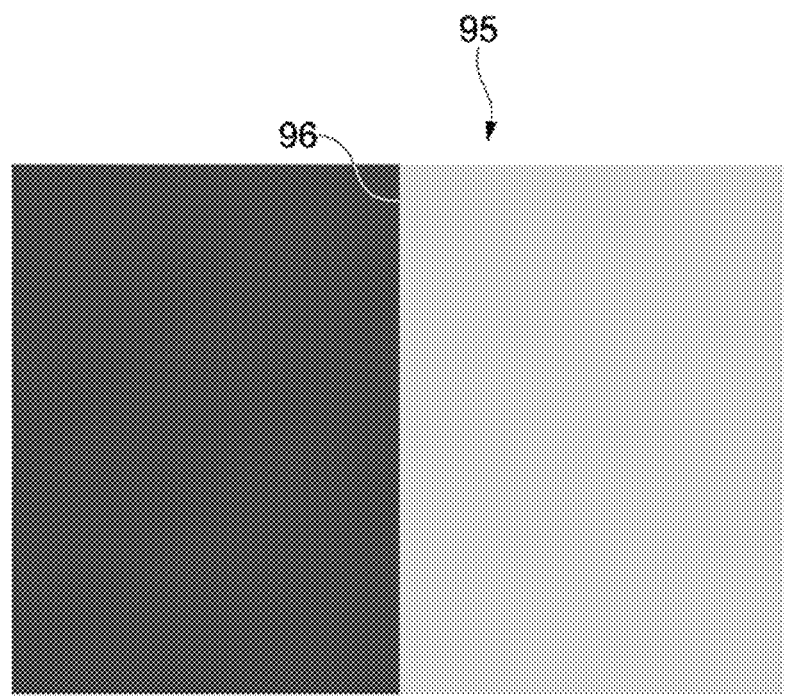
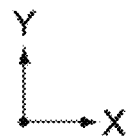
FIG.17

INFORMATION PROCESSING APPARATUS, INFORMATION PROCESSING METHOD ADJUSTMENT APPARATUS, AND IMAGE DISPLAY SYSTEM TO ADJUST PROJECTION POSITION OF PARALLAX IMAGES

CROSS REFERENCE TO RELATED APPLICATIONS

This application is a U.S. National Phase of International Patent Application No. PCT/JP2015/001227 filed on Mar. 6, 2015, which claims priority benefit of Japanese Patent Application No. JP 2014-088514 filed in the Japan Patent Office on Apr. 22, 2014. Each of the above-referenced applications is hereby incorporated herein by reference in its entirety.

TECHNICAL FIELD

The present technology relates to an information processing apparatus, an information processing method, a program, an adjustment apparatus, and an image display system for adjusting positions of a plurality of projection images.

BACKGROUND ART

In the past, a technology in which a plurality of projectors are used to project a plurality of images on a screen has been used. For example, a technology that displays a 3-dimensional image by projecting a plurality of parallax images or a technology that displays an image with high brightness by projecting the same images so that the images overlap one another has been known. Further, it is possible to perform display on a large screen by arranging and displaying a plurality of images.

In the image projection position adjustment apparatus described in Patent Document 1, test patterns with different colors are projected from two different projectors so that the patterns overlap one another. Then, an image of the two projected test patterns is picked up by a camera, and the projection position is adjusted on the basis of a change in color information in the picked-up image (e.g., paragraphs [0043] to [0061] and FIG. 5 of Patent Document 1).

Patent Document 1: Japanese Patent Application Laid-open No. 2014-10264

SUMMARY

Problem to be Solved

As described above, it is desired to adjust, with high accuracy, the projection position when a plurality of images are projected.

In view of the circumstances as described above, it is an object of the present technology to provide an information processing apparatus, an information processing method, a program, an adjustment apparatus, and an image display system that are capable of adjusting the projection position of a projection image with high accuracy.

Means for Solving the Problem

In order to achieve the above-mentioned object, an information processing apparatus according to an embodiment of the present technology includes an acquisition unit, a projection control unit, a storage unit, and an adjusting unit.

The acquisition unit acquires output values of a plurality of pixels from an image sensor, the image sensor including the plurality of pixels, the plurality of pixels having a predetermined pixel size.

The projection control unit is capable of causing a first projection apparatus to project a first pattern image, and causing a second projection apparatus to project a second pattern image with a distance smaller than the predetermined pixel size as a unit of movement of a projection position, the first pattern image including one or more boundaries that are boundaries between a bright section and a dark section, the second pattern image including one or more corresponding boundaries corresponding to the one or more boundaries.

The storage unit stores, as a reference value, an output value of one or more predetermined reference pixels in which an image of the one or more boundaries is formed, the output value being acquired from the image sensor that picks up the first pattern image projected by the first projection apparatus.

The adjusting unit adjusts the projection position by comparing, for each movement of the projection position, an output value of the one or more predetermined reference pixels and the stored reference value, the output value of the one or more predetermined reference pixels being acquired from the image sensor that picks up the second pattern image projected by the second projection apparatus while moving the projection position in units of the movement after the projection of the first pattern image is stopped.

In the present technology, the second pattern image is projected while moving the projection position with a distance smaller than the pixel size as the unit of movement. At this time, the output value of the reference pixel is acquired from the image sensor. When an image of the corresponding boundary of the second pattern image is formed in the reference pixel, the output value is changed depending on the change in size of the bright section whose image is formed in the reference pixel. Therefore, by comparing the output value of the reference pixel and the reference value with each other, it is possible to adjust, with high accuracy, the projection position with the boundary of the first pattern image and the corresponding boundary of the second pattern image as a reference.

The one or more boundaries may include a first boundary that extends in a first direction. In this case, the one or more corresponding boundaries may include a first corresponding boundary that extends in the first direction. Further, the projection control unit may be capable of moving the projection position in units of the movement along a second direction perpendicular to the first direction.

Accordingly, it is possible to adjust, with high accuracy, the projection position in the second direction.

The one or more boundaries include a second boundary that extends in the second direction, the one or more corresponding boundaries includes a second corresponding boundary that extends in the first direction, and the projection control unit is capable of moving the projection position in units of the movement along the first and second directions.

Accordingly, it is possible to adjust, with high accuracy, the projection position in the first and second directions.

The one or more predetermined reference pixels may include a first reference pixel in which an image of the first boundary is formed and a second reference pixel in which an image of the second boundary is formed. In this case, the first and second reference pixels may be set on the basis of a pixel in which an image of an adjustment point is formed, the adjustment point being an intersection point between the first boundary and the second boundary.

Accordingly, it is possible to adjust, with high accuracy, the projection position with the adjustment point as a reference.

The first pattern image may be a checker pattern in which the bright section and the dark section are alternately arranged along the first and second directions. In this case, the first reference pixel may include two pixels away from each other in other directions along the first direction by an amount of predetermined pixels from a pixel in which an image of an intersection point of the checker pattern is formed. Further, the second reference pixel may include two pixels away from each other in other directions along the second direction by an amount of predetermined pixels from the pixel in which an image of the intersection point of the checker pattern is formed.

In this way, using a plurality of intersection points included in the checker pattern as adjustment points, four reference pixels are set with each adjustment point as a reference. Accordingly, it is possible to adjust, with high accuracy, the projection position.

The second pattern image may be the same image as the first pattern image.

Accordingly, it is possible to cause, with high accuracy, the projection image from the first projection apparatus and the projection image from the second projection apparatus to overlap one another.

An information processing method according to an embodiment of the present technology is an information processing method executed by a computer capable of acquiring output values of a plurality of pixels from an image sensor, the image sensor including the plurality of pixels, the plurality of pixels having a predetermined pixel size, the information processing method including causing a first projection apparatus to project a first pattern image, the first pattern image including one or more boundaries that are boundaries between a bright section and a dark section.

As a reference value, an output value of one or more predetermined reference pixels in which an image of the one or more boundaries is formed is stored, the output value being acquired from the image sensor that picks up the first pattern image projected by the first projection apparatus.

A second projection apparatus is caused to project a second pattern image with a distance smaller than the predetermined pixel size as a unit of movement of a projection position while moving the projection position in units of the movement after the projection of the first pattern image is stopped, the second pattern image including one or more corresponding boundaries corresponding to the one or more boundaries.

The projection position is adjusted by comparing, for each movement of the projection position, an output value of the one or more predetermined reference pixels and the stored reference value, the output value of the one or more predetermined reference pixels being acquired from the image sensor that picks up the second pattern image projected by the second projection apparatus.

A program according to an embodiment of the present technology causes a computer, which is capable of acquiring output values of a plurality of pixels from an image sensor, the image sensor including the plurality of pixels, the plurality of pixels having a predetermined pixel size, to execute the steps of:

causing a first projection apparatus to project a first pattern image, the first pattern image including one or more boundaries that are boundaries between a bright section and a dark section;

storing, as a reference value, an output value of one or more predetermined reference pixels in which an image of the one or more boundaries is formed, the output value being acquired from the image sensor that picks up the first pattern image projected by the first projection apparatus;

causing a second projection apparatus to project a second pattern image with a distance smaller than the predetermined pixel size as a unit of movement of a projection position while moving the projection position in units of the movement after the projection of the first pattern image is stopped, the second pattern image including one or more corresponding boundaries corresponding to the one or more boundaries; and adjusting the projection position by comparing, for each movement of the projection position, an output value of the one or more predetermined reference pixels and the stored reference value, the output value of the one or more predetermined reference pixels being acquired from the image sensor that picks up the second pattern image projected by the second projection apparatus.

An adjustment apparatus according to an embodiment of the present technology includes an image sensor, a projection control unit, a storage unit, and an adjusting unit.

The image sensor includes a plurality of pixels, the plurality of pixels having a predetermined pixel size.

The projection control unit is capable of causing a first projection apparatus to project a first pattern image, and causing a second projection apparatus to project a second pattern image with a distance smaller than the predetermined pixel size as a unit of movement of a projection position, the first pattern image including one or more boundaries that are boundaries between a bright section and a dark section, the second pattern image including one or more corresponding boundaries corresponding to the one or more boundaries.

The storage unit stores, as a reference value, an output value of one or more predetermined reference pixels in which an image of the one or more boundaries is formed, the output value being output from the image sensor that picks up the first pattern image projected by the first projection apparatus.

The adjusting unit adjusts the projection position by comparing, for each movement of the projection position, an output value of the one or more predetermined reference pixels and the stored reference value, the output value of the one or more predetermined reference pixels being output from the image sensor that picks up the second pattern image projected by the second projection apparatus while moving the projection position in units of the movement after the projection of the first pattern image is stopped.

An image display system according to an embodiment of the present technology includes a projection unit, the image sensor, the projection control unit, the storage unit, and the adjusting unit.

The projection unit includes a first projection apparatus and a second projection apparatus that are capable of projecting an image.

Effects

As described above, according to the present technology, it is possible to adjust the projection position of a projection image with high accuracy. Note that the effects described herein are not necessarily limited, and may be any of the effects described herein.

BRIEF DESCRIPTION OF DRAWINGS

FIGS. 14A-14D A diagram for describing an output value in the case where a projection position is moved in units of movement smaller than a pixel size.

FIG. 17 A schematic diagram showing another configuration example of a pattern image for adjustment according to the present technology.

DESCRIPTION OF PREFERRED EMBODIMENTS

Hereinafter, embodiments of the present technology will be described with reference to the drawings.

[Configuration of Image Display System]

Figure 1:
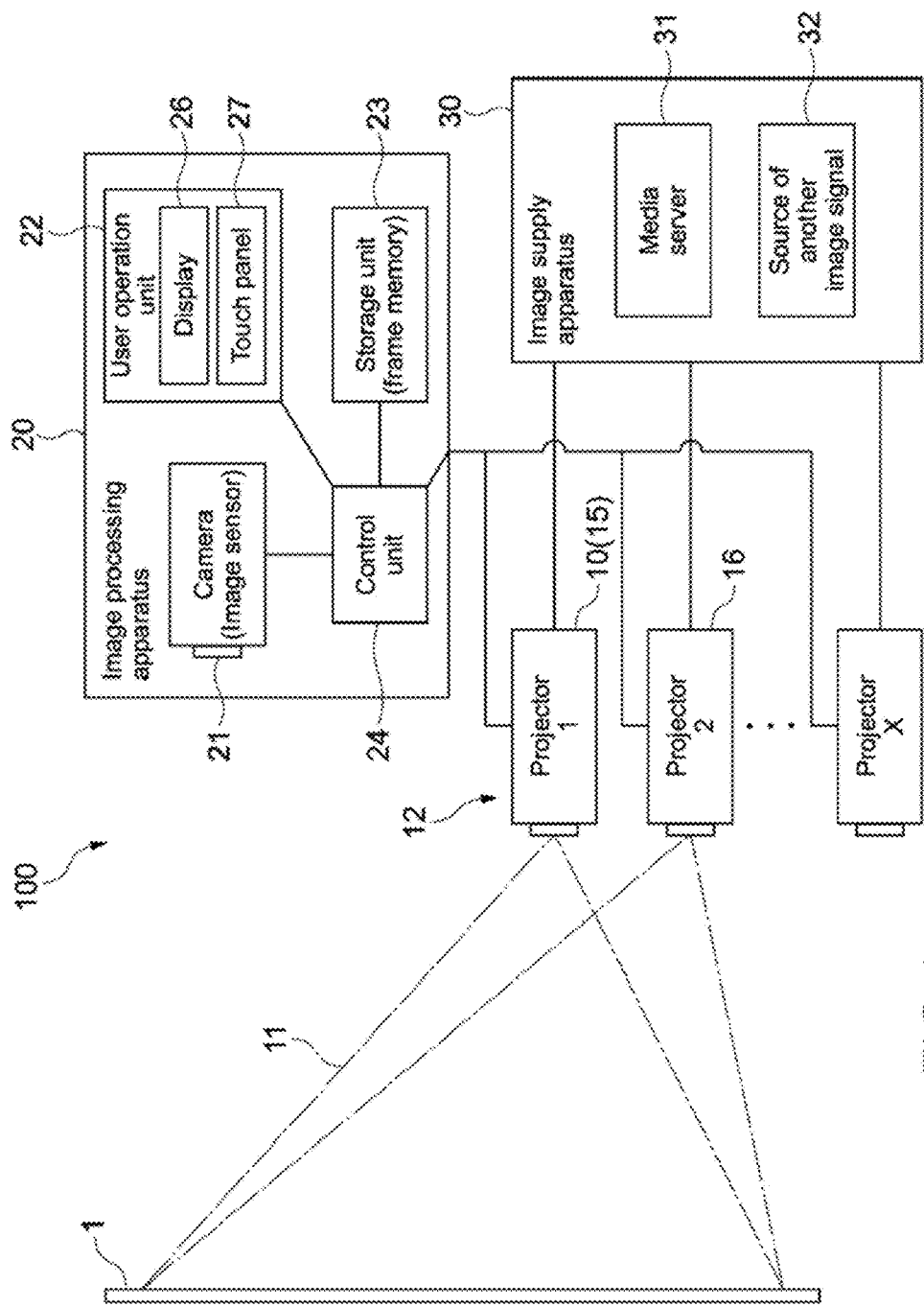
FIG. 1 A schematic diagram showing a configuration example of an image display system according to an embodiment of the present technology.

FIG. 1 is a schematic diagram showing a configuration example of an image display system according to an embodiment of the present technology. An image display system 100 includes a plurality of projectors (projection apparatuses) 10 capable of projecting an image on a screen 1 or the like, an image processing apparatus (adjustment apparatus) 20 capable of controlling the operation of each projector 10, and an image supply apparatus 30 that supplies, to each projector 10, an image signal including information on an image to be projected. The image supply apparatus 30 is capable of supplying, to each projector 10, an image signal including a still image and a moving image.

The projectors 10 are each used as, for example, a projector for presentation or digital cinema. The projectors 10 each include a light source (not shown), a light modulation element that modulates, on the basis of the image signal, light from a light source, and a projection unit that projects modulated light (image) modulated by the light modulation element (any of which is not shown). As the light source, a solid-state light source such as an LED (Light Emitting Diode) and an LD (Laser Diode) is used. As the light modulation element, for example, a liquid crystal panel or a digital micromirror device (DMD) is used.

In this embodiment, color images 11 are projected from the plurality of projectors 10. The plurality of images 11 are simultaneously projected at a predetermined projection position, thereby achieving, for example, display of a 3-dimensional image, display of an image with high brightness, or display of an image on a larger screen. Note that the projectors 10 do not necessarily simultaneously display images.

In this embodiment, the same model projectors 10 are arranged and used. The projectors 10 are each capable of displaying an image with high resolution called 4K high definition or 8K ultra high definition. Then, the projectors 10 are each capable of controlling the projection position of the image 11 in units of quarter pixels as an electrical correction block. Specifically, the projectors 10 are each capable of moving the projection position in units of movement corresponding to quarter pixels. The specific configuration or method for moving the projection position is not limited.

By the plurality of projectors 10, a projection unit 12 according to this embodiment is realized. The specific configuration of the projection unit 12 is not limited to the one described above, and may be appropriately set. The specific example of each projector 10, the resolution of each image 11 to be projected, the unit of movement in control of the projection position, and the like may be appropriately set. The plurality of projectors 10 may include a different model projector. Further, as the projection apparatus that projects the image 11, an apparatus other than the projectors 10 may be used.

The image supply apparatus 30 can be realized by, for example, a PC (Personal Computer). The image supply apparatus 30 includes a media server 31 that stores an image signal and transmits the image signal to the projector 10. In addition, in the image supply apparatus 30, a pattern image for adjusting the projection position used in the present technology and the like is stored as a source 32 of another image signal. The pattern image for adjustment may be stored in each projector 10.

The specific configuration of the image supply apparatus 30 is not limited. The method or configuration for supplying an image, the form of connection or method for communication between the image supply apparatus 30 and the projectors 10, and the like may be appropriately set. For example, the apparatuses may be connected to each other via a network or the like.

The image processing apparatus 20 includes a camera (imaging apparatus) 21 that picks up the image 11 projected by the projector 10, an operation unit 22 that receives a user's operation, a storage unit 23 that stores the picked-up image 11, various parameters, and the like, and a control unit 24 that performs various kinds of control and calculation.

The camera 21 includes an image sensor including a plurality of pixels having a predetermined pixel size (any of which is not shown). As the image sensor, an image sensor such as a CMOS (Complementary Metal Oxide Semiconductor) sensor and a CCD (Charge Coupled Device) sensor is used.

In the present technology, as the camera 21, a camera having a pixel size larger than the unit of movement of the projection position is used. Conversely, movement of the projection position is performed in units of movement corresponding to a distance smaller than the pixel size of the image sensor that picks up the projection image 11. Therefore, by performing the movement a plurality of times, the amount of movement becomes equal to the pixel size of the image sensor or exceeds the pixel size.

Typically, as the camera 21, a camera with resolution smaller than the resolution of the projector 10 is used. For example, an HD camera with resolution of 1920×1080 (pixel) is used for the projector 10 capable of projecting a 4K image. In the present technology, it is possible to adjust, with high accuracy, the projection position of the projection image 11 with high resolution by using the camera 21 with such small resolution. Note that the resolution of the projector 10 and the resolution of the camera 21 do not necessarily need to have the above-mentioned relationship, and the present technology can be applied as long as the projection position is adjusted in units of distances smaller than the pixel size of the image sensor.

In addition, even in the case where the resolution of the camera 21 is higher than the resolution of the projector 10 and the original pixel size of the camera 21 is smaller than the unit of movement of the projection image formed on the image sensor, the present technology can be applied by supposedly regarding the plurality of pixels as one pixel. For example, by summing each output of the plurality of pixels, it is possible to supposedly regard the pixels as one pixel. In this case, the size of the pixels supposedly regarded as one pixel is the pixel size according to the present technology.

Note that in the present disclosure, description will be made with one pixel (unit pixel), which is a unit for forming the image 11, as a reference. The output value from a sub-pixel constituting the unit pixel may be used to implement the present technology.

The operation unit 22 includes, a display 26 including, for example, a display device using liquid crystal, EL (Electro-Luminescence), or the like, and a touch panel 27 integrated therewith.

The storage unit 23 includes, for example, a ROM (Read Only Memory) and an HDD (Hard Disk Drive), and functions as a frame memory. Further, the storage unit 80 stores the output value of each of the plurality of pixels output from the image sensor.

The control unit 24 controls the operation of blocks in the image processing apparatus 20. Further, the control unit 24 is capable of controlling the operation of each projector 10 by outputting a predetermined command to the projector 10. Note that the form of connection or method for communication between the image processing apparatus 20 and the projectors 10 is not limited. Further, also the configuration or method for controlling the operation of the projectors 10 is not limited.

The control unit 24 includes, for example, a CPU (Central Processing Unit), a RAM (Random Access Memory), and a ROM, and the CPU loads a program stored in the ROM in advance into the RAM, and executes the program, thereby performing predetermined processing. Further, the CPU executes a predetermined program, thereby realizing a predetermined function block. The specific configuration of the control unit 24 is not limited, and arbitrary hardware and software may be used. In this embodiment, by the control unit 24, an acquisition unit, a projection control unit, and an adjustment unit are realized.

The program may be installed via, for example, a storage medium, or may be installed via a global network or the like. Further, the program may be a program in which processing is chronologically performed or may be a program in which processing is performed in parallel or at a necessary timing, for example, upon calling.

[Operation of Image Display System]

Figure 2:
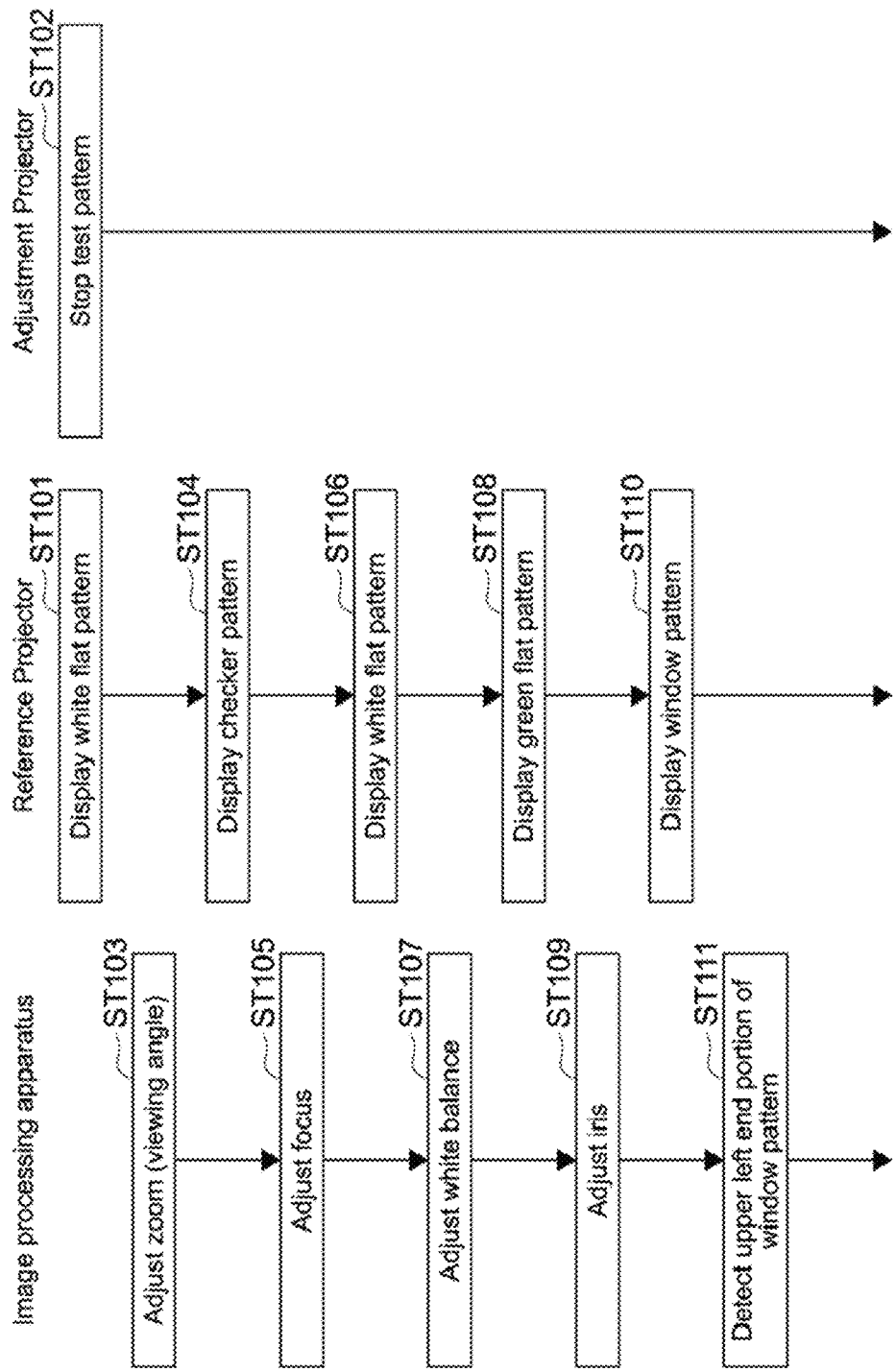
FIG. 2 A sequence diagram showing operation examples of an image processing apparatus, a reference projector, and an adjustment projector.
Figure 3:
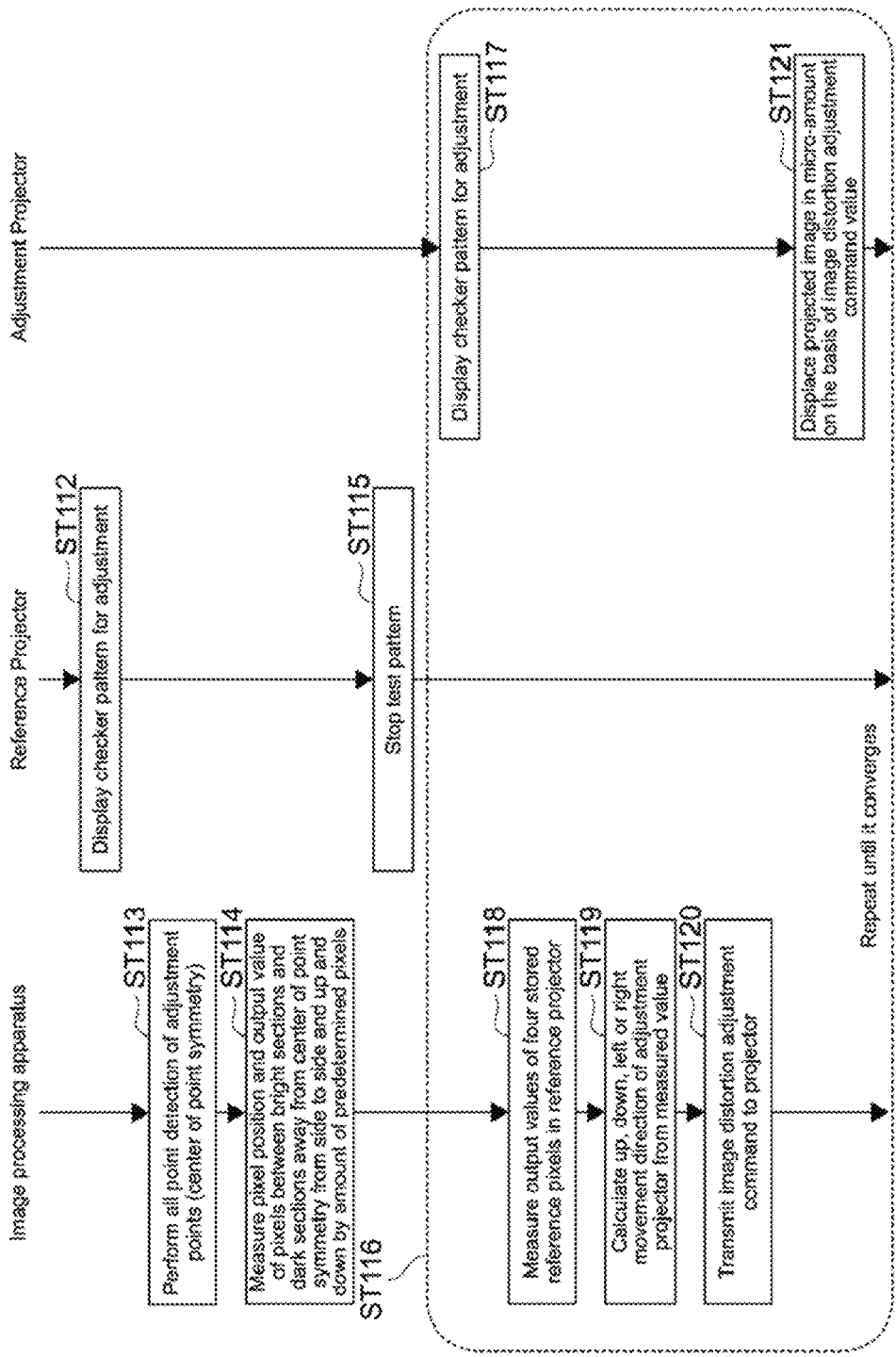
FIG. 3 A sequence diagram showing operation examples of the image processing apparatus, the reference projector, and the adjustment projector.
Figure 4:
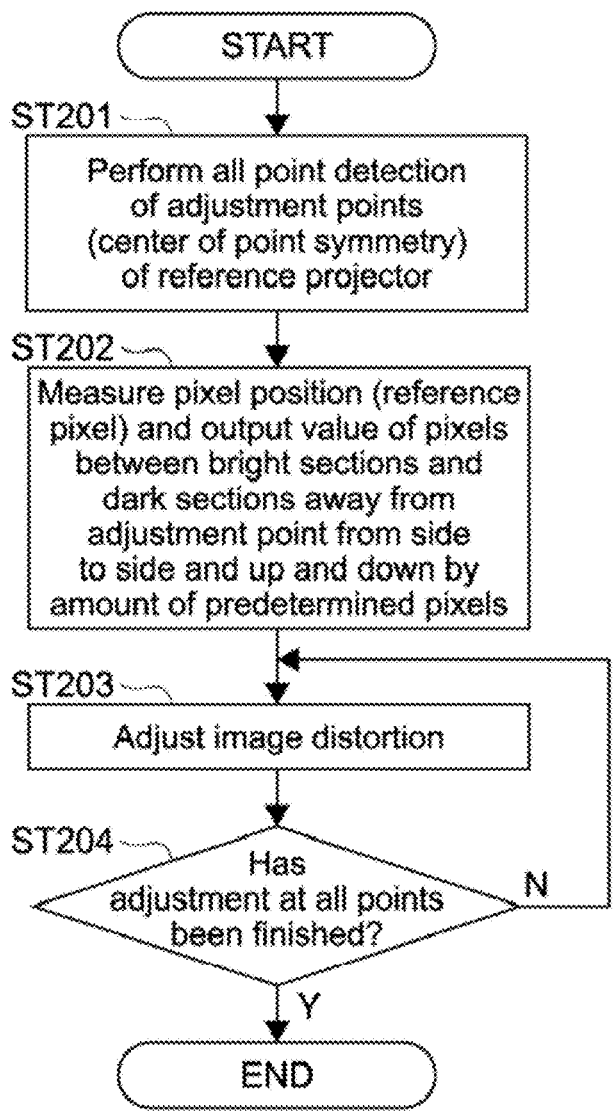
FIG. 4 A flowchart showing an operation example of an image processing apparatus 20.
Figure 5:
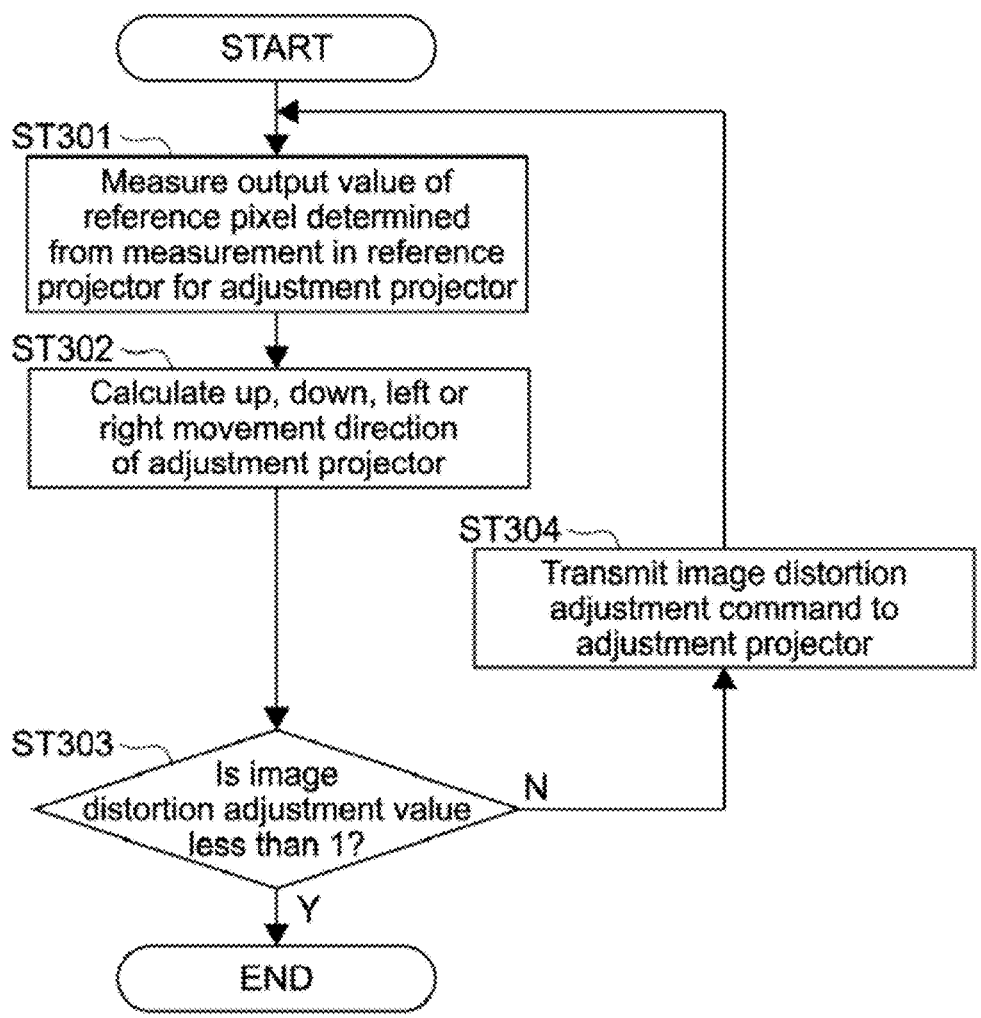
FIG. 5 A flowchart showing an operation example of the image processing apparatus 20.

As the operation of the image display system 100, adjustment of the projection position will be mainly described. FIGS. 2 and 3 are each a sequence diagram showing operation examples of the image processing apparatus 20, a reference projector 15, and an adjustment projector 16. FIGS. 4 and 5 are each a flowchart showing an operation example of the image processing apparatus 20.

In the present technology, one of two projectors 10 is set as the reference projector 15, and the other is set as the adjustment projector 16. Then, the projection position of the image 11 projected by the adjustment projector 16 for the projection image 11 projected by the reference projector 15 is adjusted. Note that the reference projector 15 and the adjustment projector 16 respectively correspond to a first projection apparatus and a second projection apparatus in this embodiment.

How to set the reference projector 15 and the adjustment projector 16 among the plurality of projectors 10 may be arbitrarily determined. For example, one projector 15 is set as the reference projector, and another projector 10 is set as the adjustment projector 16. Alternatively, a pair of the reference projector 15 and the adjustment projector 16 may be sequentially selected. It only has to set one of two projectors 10 that need to adjust their adjustment positions as the reference projector 15 and the other as the adjustment projector 16.

First, the reference projector 15 displays a white flat pattern (Step 101). The white flat pattern is a pattern image in which all pixels display a white color. Note that projection of a test pattern from the adjustment projector 16 is stopped (Step 102).

The control unit 24 adjusts the zoom (viewing angle) of the camera 21 using the white flat pattern projected on the screen 1 as a reference (Step 103). Typically, the zoom is adjusted so that the entire image projected from the reference projector 15 is included in the image-pickup range. A pattern image different from the white flat pattern may be used to adjust the zoom.

The reference projector 15 displays a checker pattern (Step 104). The control unit 24 adjusts the focus of the camera 21 using the checker pattern as a reference (Step 105). The method for adjusting the focus and the like is not limited, and also a pattern image for focus adjustment is not limited.

The reference projector 15 displays the white flat pattern again (Step 106). The control unit 24 adjusts the white balance of the camera 21 using the white flat pattern as a reference (Step 107). Another pattern image may be projected for adjusting the white balance.

The reference projector 15 displays a green flat pattern (Step 108). The green flat pattern is a pattern image in which all pixels display a green color. The control unit 24 adjusts the iris of the camera 21 using the green flat pattern as a reference (Step 109). Another pattern image may be projected for adjusting the iris.

The reference projector 15 displays a window pattern (Step 110). The window pattern is a pattern image for the image processing apparatus 20 to detect a particular position of an image projected by the reference projector 15.

Figure 6:
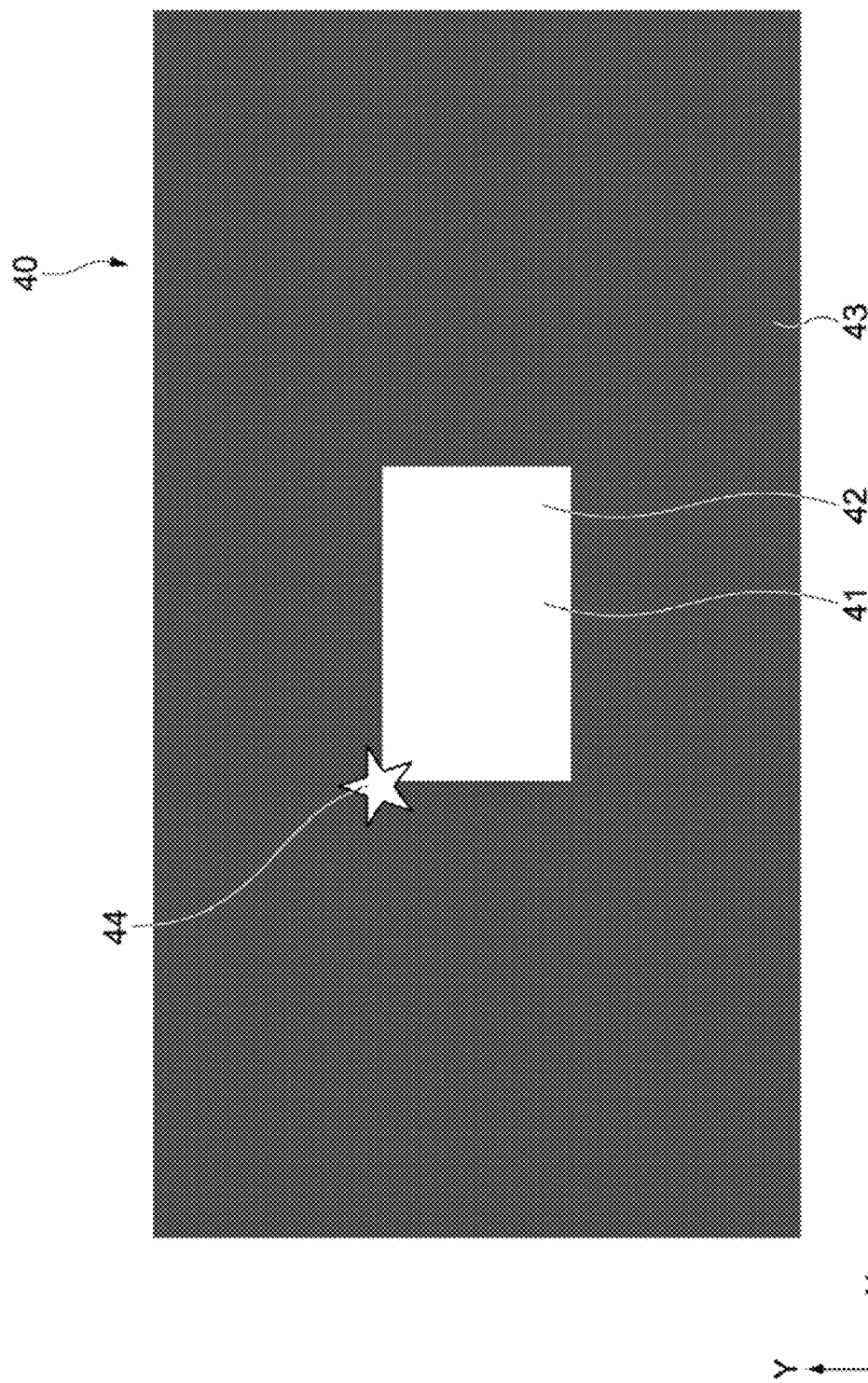
FIG. 6 A schematic diagram showing a configuration example of a window pattern.
Figure 7:
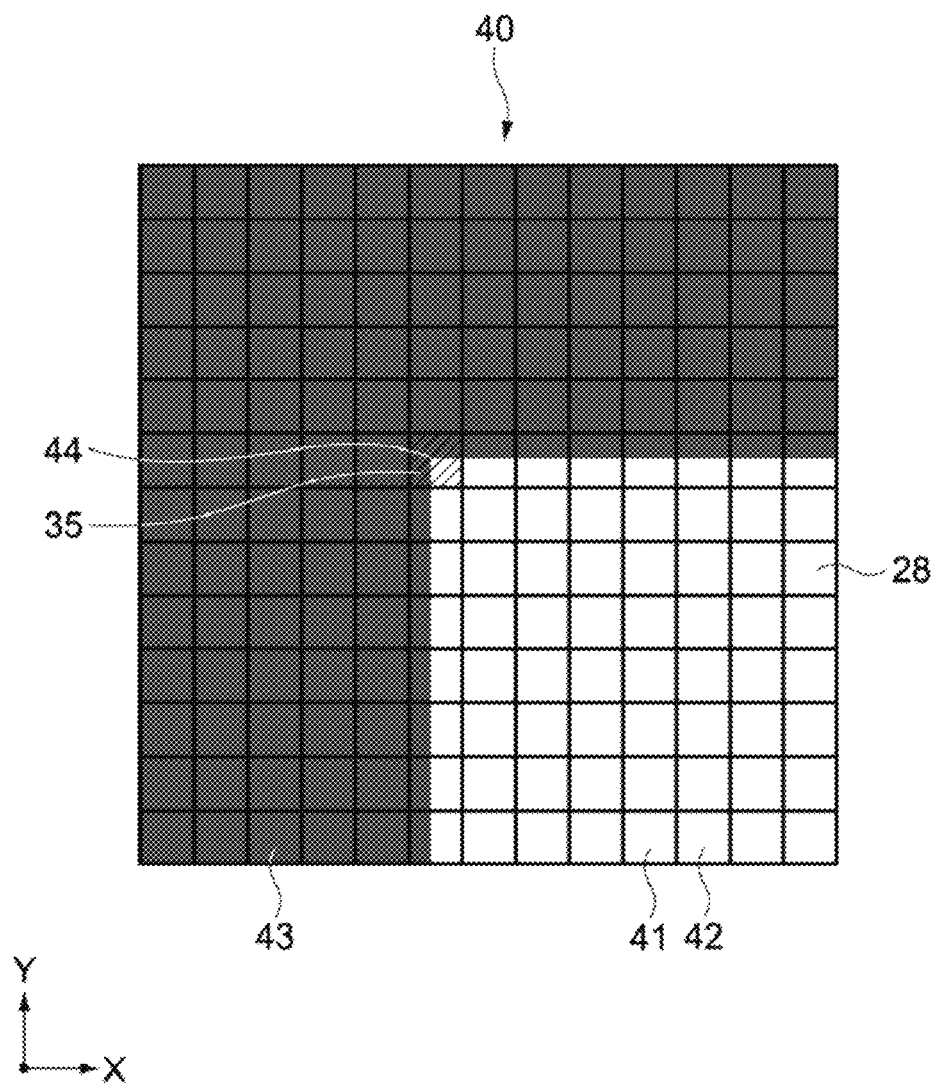
FIG. 7 An enlarged diagram of a part of the window pattern.

FIG. 6 is a schematic diagram showing a configuration example of a window pattern 40. FIG. 7 is an enlarged diagram of a part of the window pattern 40. In FIG. 7, the enlarged portion is shown in a rectangular shape. It goes without saying that the pattern image covers the outside of the enlarged portion. The same shall apply to the following enlarged diagrams.

In this embodiment, as the window pattern 40, a pattern image having a rectangular window 41 at the center is displayed. An inside 42 of the window 41 is displayed in a white color and an outside 43 of the window 41 is displayed in a black color (shown in a dark gray color in the figure).

On the basis of the picked-up image of the window pattern 40, an upper left end portion 44 of the window 41 is detected (Step 111). In FIG. 7, a plurality of pixels 28 of the image sensor that picks up an image of the window pattern 40 are schematically shown. Out of the plurality of pixels 28, a pixel in which an image of the upper left end portion 44 of the window 41 is formed is detected. This can be detected from the output value of each of the plurality of pixels 28. Hereinafter, this pixel is referred to as an end portion corresponding pixel 35.

The reference projector 15 displays a checker pattern for adjustment (first pattern image) (Step 112). The checker pattern for adjustment is a pattern image projected for adjusting the projection position of the reference projector 15 and the adjustment projector 16.

Figure 8:
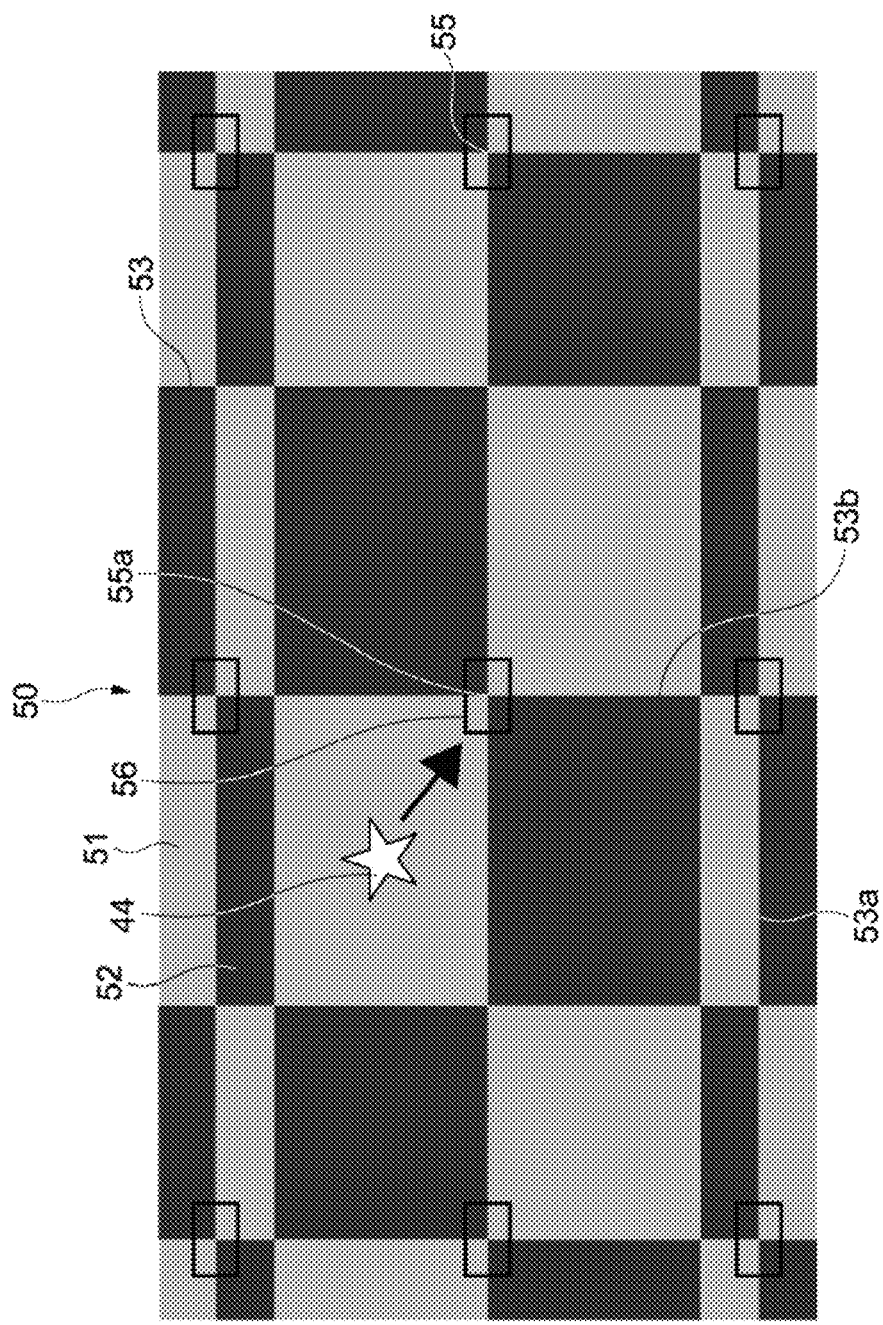
FIG. 8 A schematic diagram showing a configuration example of a checker pattern for adjustment.

FIG. 8 is a schematic diagram showing a configuration example of the checker pattern for adjustment. A checker pattern for adjustment 50 includes a plurality of bright sections 51, a plurality of dark sections 52, and one or more boundaries 53. The bright sections 51 are each displayed in a green color, and the dark sections 52 are each displayed in a black color. The one or more boundaries 53 are formed between the bright sections 51 and the dark sections 52.

As shown in FIG. 8, in this embodiment, the bright sections 51 and the dark sections 52 are alternately arranged along an x-axis direction (first direction) and a y-axis direction (second direction), thereby configuring the checker pattern for adjustment 50. The shape, size, arrangement position, and the like of each of the bright sections 51 and the dark sections 52 may be appropriately set.

Further, in the one or more boundaries 53, a boundary that extends in the x-axis direction is a first boundary 53a and a boundary that extends in the y-axis direction is a second boundary 53b. The control unit 24 that functions as a projection control unit is capable of moving the projection position of each projector 10 along the x-axis and y-axis directions.

An intersection point between the first boundary 53a that extends in the x-axis direction and the second boundary 53b that extends in the y-axis direction is set as an adjustment point 55. The adjustment point 55 is a reference point for adjusting the projection position. When the reference projector 15 displays the checker pattern for adjustment 50, as shown in FIG. 8, a frame 56 or the like that represents the adjustment point 55 may be superimposed on the pattern and displayed. Accordingly, the user can understand which point is used as a reference to perform adjustment. Note that all intersection points in the checker pattern for adjustment may be set as the adjustment point 55, or a part of the intersection points may be set as the adjustment point 55.

On the basis of the picked-up image of the checker pattern for adjustment 50, all point detection of the adjustment points 55 in the checker pattern for adjustment 50 is performed (Step 113, Step 201 in FIG. 4). Specifically, out of the plurality of pixels 28, pixels in which an image of the adjustment point 55 is formed (hereinafter, referred to as adjustment pixels) are detected.

Figure 9:
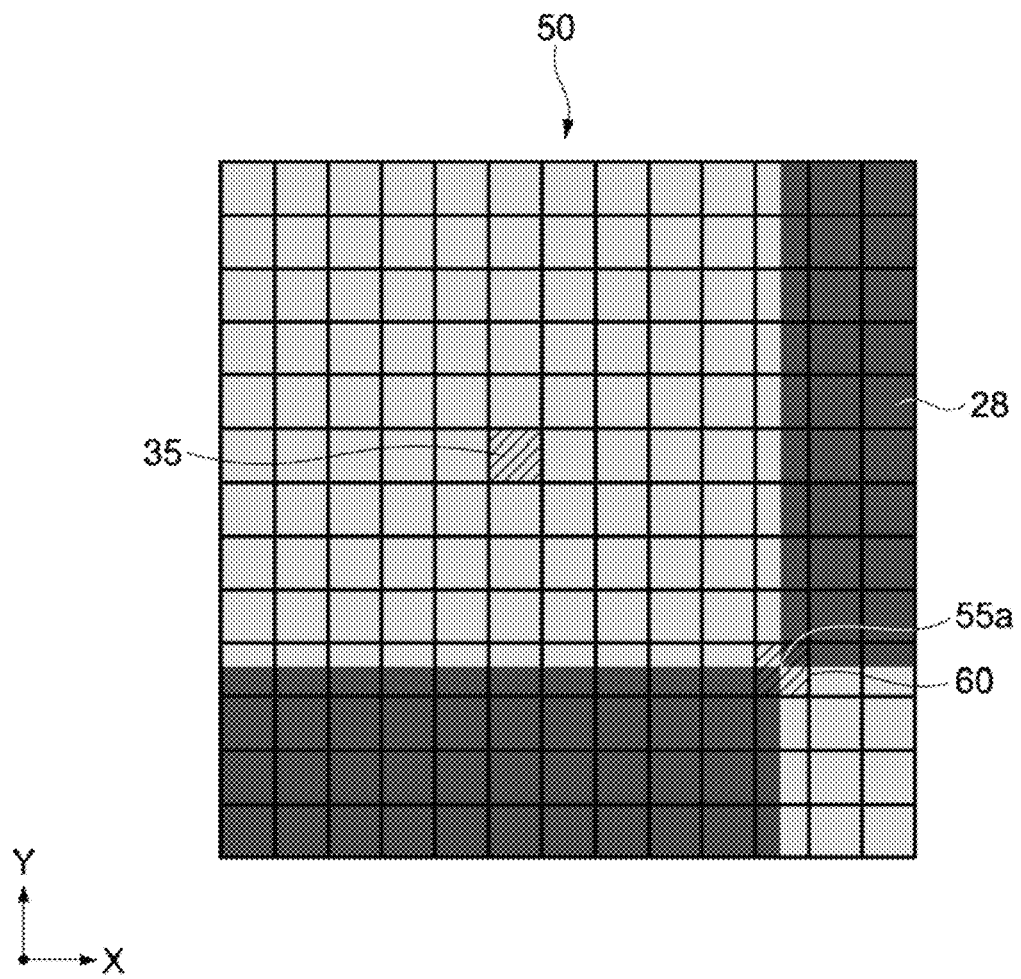
FIG. 9 An enlarged diagram for describing detection of an adjustment pixel.

FIG. 9 is an enlarged diagram for describing detection of the adjustment pixel. The detection of an adjustment pixel 60 is performed on the basis of the end portion corresponding pixel 35 corresponding to the upper left end portion 44 of the window 41 detected in Step 111. For example, when an adjustment point 55a shown in the center of FIG. 8 is detected, the adjustment pixel 60 is detected, on the basis of the output value of each pixel 28, in a direction from the end portion corresponding pixel 35 toward the lower right.

For example, a pixel whose output value is between an output value corresponds to a green color (hereinafter, referred to as high output value) and an output value corresponds to a black color (hereinafter, referred to as low output value) is detected in a direction from the end portion corresponding pixel 35 along the x-axis direction. In a direction from that pixel along the y-axis direction, a pixel whose output value is different from the output value of that pixel is detected as the adjustment pixel 60. Another method may be used to detect the adjustment pixel.

The shape and the like of the window pattern 40 shown in FIG. 6 may be appropriately set for detecting the adjustment pixel 60. For example, the window pattern 40 is set so that positions that are not on the boundary 53, i.e., positions within the bright sections 51 and the dark sections 52 in the checker pattern for adjustment 50 can be identified. Alternatively, a pattern image other than the window pattern 40 may be used as long as the position in the projection image 11 can be identified.

Note that it does not necessarily need to use a pattern image such as the window pattern 40, and the adjustment pixel 60 in which an image of the adjustment point 55 is formed may be detected directly from the checker pattern for adjustment 50. On the other hand, by using the window pattern 40, it is possible to improve the accuracy of detecting the adjustment pixel 60.

Figure 10:
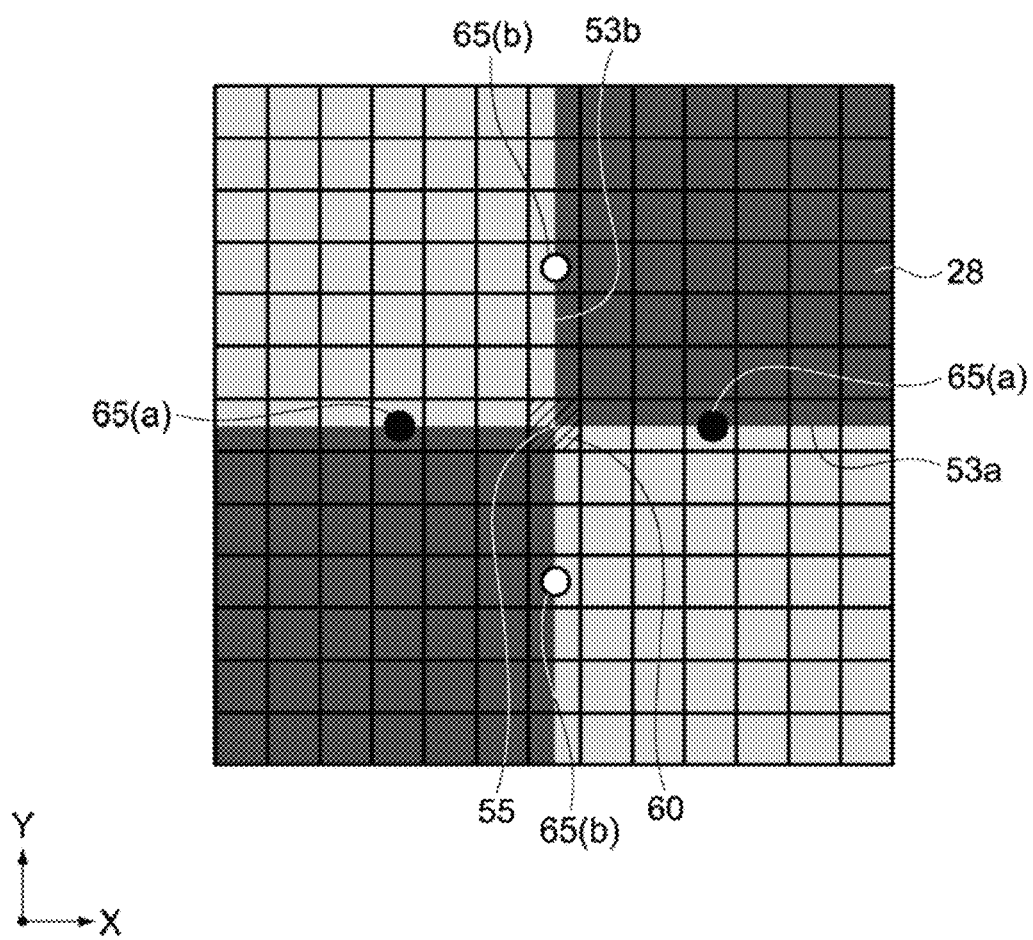
FIG. 10 An enlarged diagram for describing detection of one or more reference pixels.

One or more reference pixels in which an image of the boundary 53 in the checker pattern for adjustment 50 is formed are detected using the adjustment pixel 60 as a reference (Step 114, Step 202). FIG. 10 is an enlarged diagram for describing detection of one or more reference pixels 65. In this embodiment, the pixels 28 that are away from the adjustment pixel 60 from side to side and up and down by the amount of predetermined pixels are detected as the reference pixel 65, with the adjustment pixel 60 as the center of point symmetry.

The one or more reference pixels 65 include a first reference pixel 65a in which an image of the first boundary 53a is formed and a second reference pixel 65b in which an image of the second boundary 53b is formed. As shown in FIG. 10, the first reference pixel 65a includes two pixels 28 that are away from each other in different directions from the adjustment pixel 60 along the x-axis direction by the amount of predetermined pixels. On the other hand, the second reference pixel 65b includes two pixels 28 that are away from each other in different directions from the adjustment pixel 60 along the y-axis direction by the amount of predetermined pixels. Therefore, four reference pixels 65 are set with the adjustment pixel 60 as the center of point symmetry. The one or more reference pixels 65 are set similarly for all adjustment pixels 60. The distance from the adjustment pixel 60 may be appropriately set.

Further, in Step 114 and Step 202, the output values from the one or more reference pixels 65 are measured. The measured output values are stored in the storage unit 23 as the reference value.

Projection of the checker pattern for adjustment 50 by the reference projector 15 is stopped (Step 115). Then, adjustment of the projection position is performed (Step 116, Step 203). Hereinafter, the outline of the adjustment of the projection position will be described. The adjustment is referred to as image distortion adjustment in some cases.

FIGS. 11 to 14 are each a diagram for describing the outline of the image distortion adjustment according to this embodiment. In the following, assumption is made that the checker pattern for adjustment 50 having one intersection point substantially at the center is used for ease of description. Specifically, assumption is made that the checker pattern 50 (shown in broken lines) is displayed by the reference projector 15, and four reference pixels 65 are set using the adjustment pixel 60 corresponding to the adjustment point 55 as a reference.

After that, projection of the checker pattern for adjustment 50 is stopped, and a checker pattern for adjustment 70 (second pattern image) that is the same as the checker pattern for adjustment 50 (shown in a solid lines) is displayed by the adjustment projector 16. A boundary that extends in the x-axis direction in the checker pattern for adjustment 70 corresponds to a first corresponding boundary 73a. Further, a boundary that extends in the y-axis direction corresponds to a second corresponding boundary 73b. Specifically, boundaries of the checker pattern for adjustment 70 displayed by the adjustment projector 16 at the same positions as those of the first and second boundaries 53a and 53b in the checker pattern for adjustment 50 displayed by the reference projector 15 are respectively first and second corresponding boundaries 73a and 73b.

Figure 11:
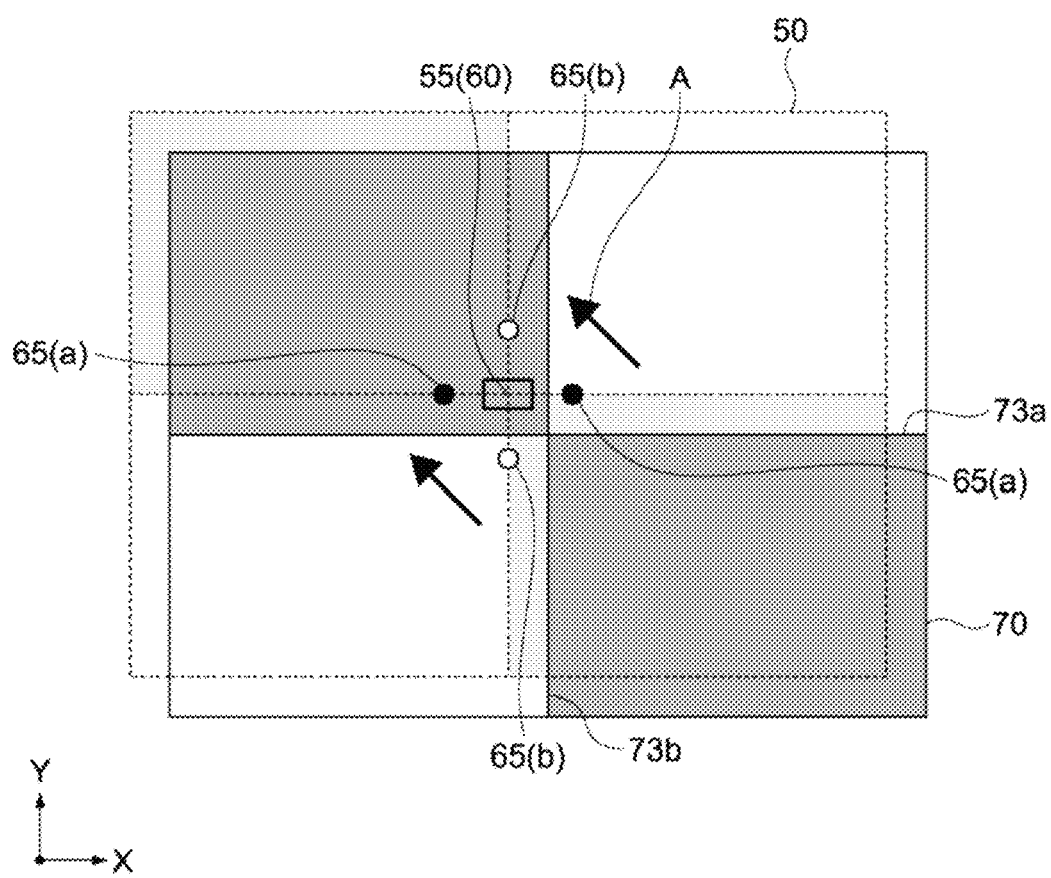
FIG. 11 A diagram for describing an outline of image distortion adjustment according to this embodiment.

The checker pattern for adjustment 70 is projected while the projection position thereof is moved in units of movement smaller than a pixel size S of the image sensor (see an arrow A in FIG. 11). At this time, output values of the four reference pixel 65 acquired from the image sensor that picks up an image of the checker pattern for adjustment 70 and four reference values stored in the storage unit 23 are compared with each other. Then, on the basis of the comparison result, adjustment of the projection position is performed. This processing is performed by the control unit 24 that functions as an adjustment unit.

Figure 12:
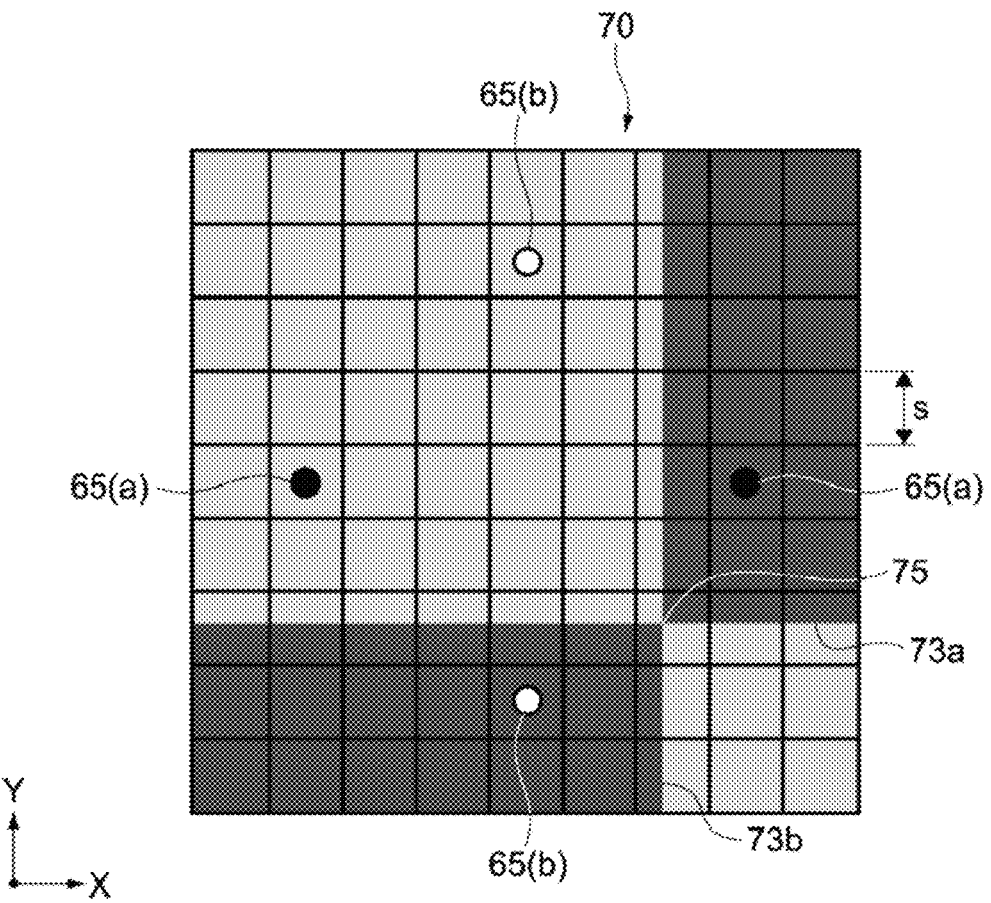
FIG. 12 A diagram for describing the outline of the image distortion adjustment according to this embodiment.

For example, assumption is made that the adjustment projector 16 projects the checker pattern for adjustment 70 in which the position of an adjustment point 75 is displaced, as shown in the enlarged diagram of FIG. 12. At this time, output values of the two first reference pixels 65a and the two second reference pixels 65b are as follows.

Figure 13:
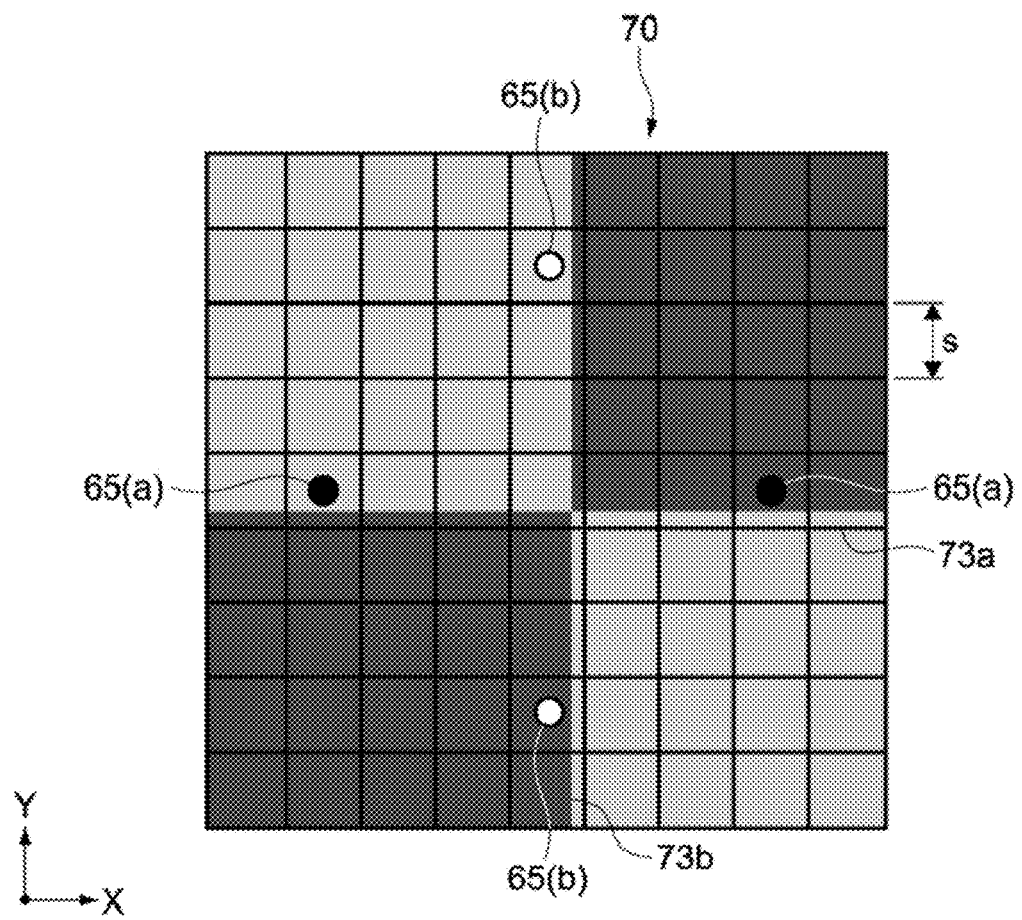
FIG. 13 A diagram for describing the outline of the image distortion adjustment according to this embodiment.

Right first reference pixel 65a Low output value
Left first reference pixel 65a High output value
Upper second reference pixel 65b High output value
Lower second reference pixel 65b Low output value On the basis of the result, the direction for moving the checker pattern for adjustment 70 can be detected. In the example shown in FIG. 12, as the direction for moving the projection position, the direction toward the upper left can be calculated. By moving the projection position in that direction, as shown in FIG. 13, the first corresponding boundary 73a is moved to the position at which an image of the first corresponding boundary 73a is formed in the two first reference pixels 65a. Further, the second corresponding boundary 73b is moved to the position at which an image of the second corresponding boundary 73b is formed in the two second reference pixels 65b. Note that it may be possible to perform adjustment toward one direction before adjustment toward the other direction. In this case, any of the first and second corresponding boundaries 73a and 73b is first moved to the position at which an image thereof is formed in the reference pixel 65.

Since the unit of movement of the projection position is smaller than the pixel size S, it needs to further adjust the projection position within the position at which an image of the corresponding boundary 73 is formed in the reference pixel 65. In this embodiment, the projection position is adjusted so that the output value of each reference pixel 65 approaches the reference value stored in the storage unit 23. As described above, it is possible to adjust the projection position using the reference value as a reference.

FIGS. 14A-14D is a diagram for describing the output value in the case where the projection position is moved in units of movement smaller than the pixel size S. For example, as shown in the A part of FIGS. 14A-14D, assumption is made that a line image L with a size smaller than the pixel size S in the x-axis direction is moved from the pixel 28 (1) to the pixel 28 (4). In this case, as shown in the B part of FIGS. 14A-14D, the output value of the pixel associated with the movement of the line image L becomes unstable, and it is very difficult to identify the position of the line image L from the output value.

On the other hand, as show in the C part of FIGS. 14A-14D, assumption is made that a block image B larger than the pixel size S is moved along the x-axis direction from the pixel (1) to the pixel 28 (4). In this case, the surface integral value of the block image B to be formed can be measured as the output value from the pixel. Specifically, the amount of movement of the block image B and the output value from the pixel covered by the block image B have a substantially linear relationship.

The inventors have newly found the correlation between the amount of movement of the block image and the output value of the single pixel, and have devised, on the basis of this, the movement of the projection position according to the present technology in which the checker pattern for adjustment 70 is moved while referring to the reference value stored in the storage unit 23. By stabilizing the slope of the output value, it is possible to adjust, with high accuracy, the position on the basis of the stored reference value. Accordingly, it is possible to adjust, with high accuracy, the projection position in micro-units smaller than the pixel size S of the image sensor.

The size of the bright sections 51 and the dark sections 52 of the checker pattern for adjustment 50 (70) needs to be larger than the pixel size S. However, this condition is substantially satisfied by forming the checker pattern.

In the checker pattern for adjustment 50 shown in FIG. 8, a plurality of adjustment points 55 are set. As shown in Step 204 of FIG. 4, adjustment is performed at all adjustment points 55. Accordingly, it is possible to perform image distortion adjustment with high accuracy. Note that the number of adjustment points 55 is not limited.

With reference to the inside of Step 116 of FIG. 3 and the flowchart of FIG. 5, another example of the adjustment of the projection position will be described. First, the adjustment projector 16 displays the checker pattern for adjustment 70 (Step 117). Each output value of the four reference pixels 65 is measured (Step 118, Step 301), and the movement direction of the projection position is calculated (Step 119, Step 302).

In this example, when the movement direction is calculated, an image distortion adjustment value is set. The image distortion adjustment value is set in advance, and decreases from a predetermined value to a value less than 1 under a predetermined rule. For example, a value that sequentially decreased from 128 (128, 64, 32 . . . 1) is used. The method for setting the image distortion adjustment value is not limited.

In Step 303, whether or not the image distortion adjustment value is less than 1 is determined. In the case where the determination is No, a value obtained by adding a sign to the image distortion adjustment value using any of upper and lower directions as a positive direction and any of right and left directions as a positive direction is output to the adjustment projector 16 as an image distortion adjustment command (Step 120, Step 304). On the basis of the image distortion adjustment command value, the projection position is adjusted (Step 121). For example, in the case where the command value of +128 is output using the upper direction in upper and lower directions as plus, the projection position is moved in the upper direction by the distance of "units of movement*128." After that, the processing is repeated until the image distortion adjustment value converges to less than 1. By such processing, it is possible to adjust, with high accuracy, image distortion while suppressing the calculation amount.

As described above, in the present technology, the checker pattern for adjustment 70 is projected while moving the projection position in units of movement corresponding to a distance smaller than the pixel size S. At this time, the output value of the reference pixel 65 is acquired from the image sensor. When an image of the corresponding boundary 73 of the checker pattern for adjustment 70 is formed in the reference pixel 65, the output value is changed depending on the change in size of the bright sections 51 whose image is formed in the reference pixel 65. Therefore, by comparing the output value of the reference pixel 65 and the reference value stored in the storage unit 23 with each other, it is possible to adjust, with high accuracy, the projection position using the boundary 53 and the corresponding boundary 73 as a reference.

For example, in the case where the above-mentioned technology described in Patent Document 1 or the like is used, it is difficult in principle to perform position adjustment with accuracy corresponding to the resolution of the camera or more. Further, because the color resolution of a general camera is half the brightness resolution of the general camera because of the structure of the Bayer arrangement color filter, the accuracy of position adjustment largely depends on the specification of the image sensor in the camera. Therefore, in the case where images projected by a plurality of projection apparatuses are tiled to supposedly increase the resolution of the projection image, for example, it is difficult to maintain the adjustment accuracy and handle this in a scalable way. In addition, if the resolution is supposedly increased by causing the camera to perform zooming, adjustment is repeated for each of the plurality of adjustment points. With this, the adjustment time is prolonged or the system is complicated because of searching for the adjustment point.

On the other hand, in the present technology, it is possible to adjust the projection position with accuracy corresponding to the resolution of the camera 21 or more, and perform adjustment with high accuracy without depending on the resolution of the camera 21. Further, it does not need to perform zooming for each adjustment point 55, and it is possible to adjust the position of the plurality of adjustment points 55 in the image by only collectively picking up an image of the entire area of the checker patterns for adjustment 50 and 70. As a result, it is possible to reduce the adjustment time. Note that the smaller the resolution of the camera 21 is, the more the number of sampling points for the surface integral value increases. Therefore, the adjustment accuracy is likely to be improved.

Further, it is possible to simultaneously detect the adjustment directions in upper and lower directions and right and left directions by using, as the detection target, the boundary portions away from each other from side to side and up and down with the adjustment point 55 as the center of point symmetry. Accordingly, it is possible to further reduce the processing time.

In the above-mentioned Patent Document 1 or the like, two images are simultaneously projected, and the position adjustment is performed on the basis of the overlapping state of the images. In this case, it is conceivable that the images overlap one another, and thus noise or the like is generated, thereby making it difficult to perform accurate position adjustment. In the present technology, after the projection of the checker pattern for adjustment 50 by the reference projector 15 is stopped, the checker pattern for adjustment 70 is projected by the adjustment projector 16. Then, by moving the checker pattern for adjustment 70, adjustment of the projection position is performed. Specifically, because it does not need to display images so that the images overlap one another, the problem of noise or the like does not occur, and it is possible to achieve high adjustment accuracy.

Other Embodiments

The present technology is not limited to the embodiments described above and can achieve other various embodiments.

Figure 15:
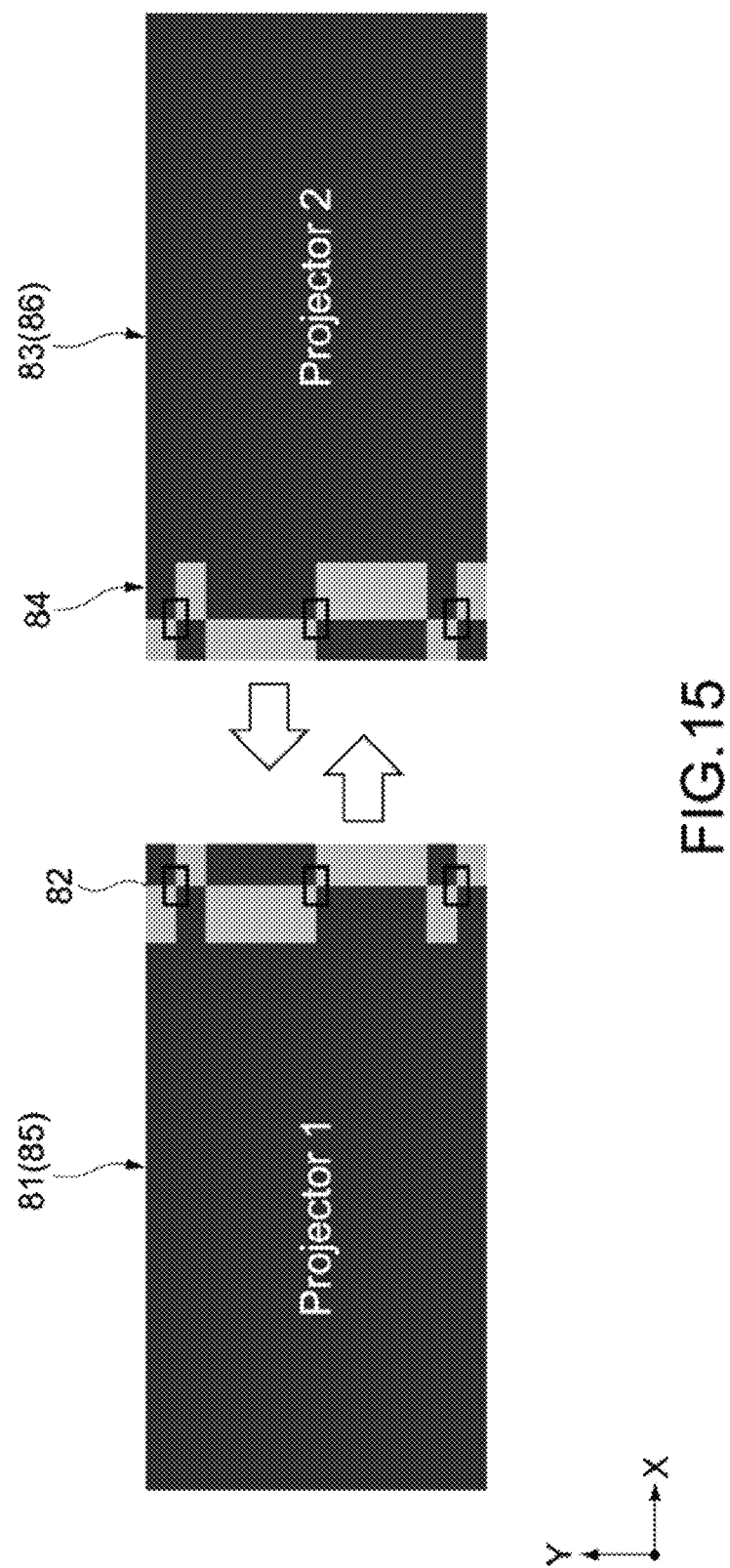
FIG. 15 A schematic diagram for describing another example of adjustment of the projection position using the present technology.

FIG. 15 is a schematic diagram for describing another example of adjustment of the projection position using the present technology. In the above, the adjustment of the projection position has been described with an example of the case where two images overlap at the same position. However, the present technology is not limited thereto, and can be applied also to the case where two images are connected as shown in FIG. 15.

As shown in FIG. 15, assumption is made that a margin area 82 at the right end of a projection image 81 projected by a reference projector (Projector1) and a margin area 84 at the left end of a projection image 83 projected by an adjustment projector (Projector2) overlap one another. In this case, it only needs to use a first pattern image 85 and a second pattern image 86 in which checker patterns are set for the margin areas 82 and 84, respectively. It goes without saying that a checker pattern may be formed in the entire image and an adjustment point for alignment may be appropriately selected.

Figure 16:
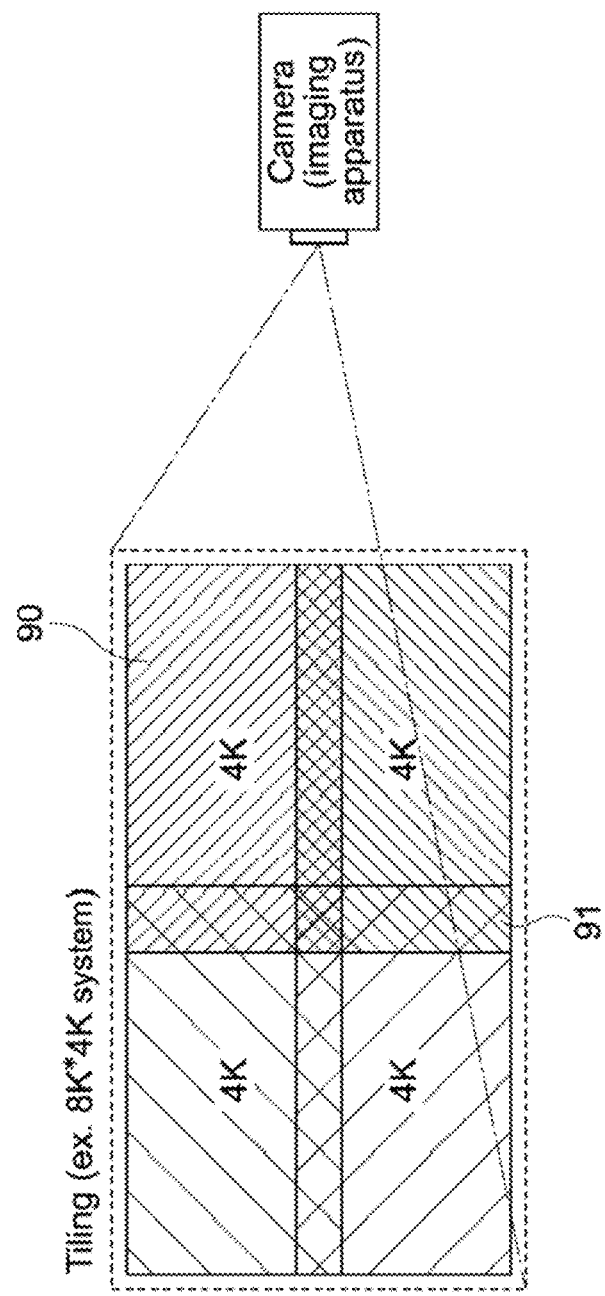
FIG. 16 A schematic diagram for describing another example of adjustment of the projection position using the present technology.

The number of images to be connected is not limited, and four images 90 may be connected to each other as shown in FIG. 16. Also in this case, by setting a checker pattern for a margin area 91, it is possible to connect the images with each other with high accuracy by applying the present technology. Also in the case where an image with high resolution such as a 4K image and a 8K image is connected, it does not need to perform zooming of the connection portion, and it is possible to easily adjust the projection position by collectively picking up an image of the entire area.

FIG. 17 is a schematic diagram showing another configuration example of a pattern image for adjustment according to the present technology. This pattern image 95 includes only a boundary 96 that extends in the y-axis direction. For example, in the case where it needs to perform adjustment toward only one direction, it only needs to use a pattern image including at least a boundary that extends in a direction perpendicular to the adjustment direction. By using the pattern image 95 shown in FIG. 17, it is possible to perform position adjustment in the x-axis direction.

The colors of the bright section and the dark section of the checker pattern are not limited, and a pattern image whose brightness changes at the boundary may be appropriately used. Note that in the case where the bright section is displayed in a white color, registration displacement may be generated. However, by displaying the bright section in a green color as described above, it is possible to avoid such a problem.

The first pattern image projected by the reference projector and the second pattern image projected by the adjustment projector do not necessarily need to be exactly the same image. For example, a part of the image, which is not included in the vicinity of the adjustment point and is independent of the adjustment processing, may be different.

After the adjustment of the projection position is finished, a list of errors at each adjustment point may be displayed. Accordingly, it is possible to know the adjustment accuracy. Further, the reference projector and the adjustment projector may be replaced with each other to perform adjustment processing again. Accordingly, it is possible to reduce the influence of the measurement error due to noise of the image sensor or the like.

The image processing apparatus shown in FIG. 1 may be achieved by a camera and a computer such as a PC connected to the camera that operate separately. In this case, the PC or the like functions as the information processing apparatus according to the present technology including the acquisition unit, the projection control unit, the storage unit, and the adjustment unit according to the present technology.

Note that the effects described in the present disclosure are merely examples and are not limited, and additional effects may be provided. The description of the plurality of effects does not represent that these effects are necessarily simultaneously exerted. It represents that at least any of the above-mentioned effects is acquired depending on the condition and the like. It goes without saying that also an effect that is not described in the present disclosure may be exerted.

Note that at least two features of the features of the above-mentioned embodiments may be combined. Specifically, various features described in each embodiment may be arbitrarily combined without distinguishing the embodiments with each other.

It should be noted that the present technology may take the following configurations.

(1)

An information processing apparatus, including:

an acquisition unit that acquires output values of a plurality of pixels from an image sensor, the image sensor including the plurality of pixels, the plurality of pixels having a predetermined pixel size;

a projection control unit capable of causing a first projection apparatus to project a first pattern image, and causing a second projection apparatus to project a second pattern image with a distance smaller than the predetermined pixel size as a unit of movement of a projection position, the first pattern image including one or more boundaries that are boundaries between a bright section and a dark section, the second pattern image including one or more corresponding boundaries corresponding to the one or more boundaries;

a storage unit that stores, as a reference value, an output value of one or more predetermined reference pixels in which an image of the one or more boundaries is formed, the output value being acquired from the image sensor that picks up the first pattern image projected by the first projection apparatus; and an adjusting unit that adjusts the projection position by comparing, for each movement of the projection position, an output value of the one or more predetermined reference pixels and the stored reference value, the output value of the one or more predetermined reference pixels being acquired from the image sensor that picks up the second pattern image projected by the second projection apparatus while moving the projection position in units of the movement after the projection of the first pattern image is stopped.

(2)

The information processing apparatus according to (1), in which the one or more boundaries include a first boundary that extends in a first direction, the one or more corresponding boundaries include a first corresponding boundary that extends in the first direction, and the projection control unit is capable of moving the projection position in units of the movement along a second direction perpendicular to the first direction.

(3)

The information processing apparatus according to (2), in which the one or more boundaries include a second boundary that extends in the second direction, the one or more corresponding boundaries includes a second corresponding boundary that extends in the first direction, and the projection control unit is capable of moving the projection position in units of the movement along the first and second directions.

(4)

The information processing apparatus according to (3), in which the one or more predetermined reference pixels include a first reference pixel in which an image of the first boundary is formed and a second reference pixel in which an image of the second boundary is formed, and the first and second reference pixels are set on the basis of a pixel in which an image of an adjustment point is formed, the adjustment point being an intersection point between the first boundary and the second boundary.

(5)

The information processing apparatus according to (4), in which the first pattern image is a checker pattern in which the bright section and the dark section are alternately arranged along the first and second directions, the first reference pixel includes two pixels away from each other in other directions along the first direction by an amount of predetermined pixels from a pixel in which an image of an intersection point of the checker pattern is formed, and the second reference pixel includes two pixels away from each other in other directions along the second direction by an amount of predetermined pixels from the pixel in which an image of the intersection point of the checker pattern is formed.

(6)

The information processing apparatus according to any one of (1) to (5), in which the second pattern image is the same image as the first pattern image.

DESCRIPTION OF REFERENCE NUMERALS

S pixel size, 10 projector, 11 image, 12 projection unit, 15 reference projector, 16 adjustment projector, 20 image processing apparatus, 21 camera (imaging apparatus), 23 storage unit, 24 control unit, 28 plurality of pixels, 50, 70 checker pattern for adjustment, 51 bright section, 52 dark section, 53 boundary, 55 adjustment point, 60 adjustment pixel, 65 reference pixel, 73 corresponding boundary, 100 image display system.

The invention claimed is:

1. An information processing apparatus, comprising:
circuitry configured to:
acquire an output value of each of a plurality of pixels of an image sensor, wherein each of the plurality of pixels has a same pixel size;
control a first projection apparatus to project, on a screen, a first pattern image that includes:
at least one first boundary between a bright section and a dark section, that extends in a first direction; and
at least one second boundary that extends in a second direction perpendicular to the first direction;
control a second projection apparatus to project, on the screen, a second pattern image with a distance smaller than the pixel size as a unit of movement of a projection position,
wherein the image sensor has a first resolution that is smaller than each of a second resolution of the first projection apparatus and a third resolution of the second projection apparatus,
wherein the second pattern image includes:
at least one third boundary that corresponds to the at least one first boundary and extends in the first direction; and at least one fourth boundary that corresponds to the at least one second boundary and extends in the second direction;
move the projection position in multiples of the unit of movement along at least one of the first direction or the second direction,
wherein the image sensor picks up a first image of the projected first pattern image;
store as a first reference value, a first output value of at least one first reference pixel of the plurality of pixels that picks up a first sub-image of the at least one first boundary;
store as a second reference value, a second output value of at least one second reference pixel of the plurality of pixels that picks up a second sub-image of the at least one second boundary
determine, an adjustment pixel from the plurality of pixels, as a third pixel that picks up a third sub-image of an adjustment point,
wherein the adjustment point is an intersection point of the at least one first boundary and the at least one second boundary,
wherein the at least one first reference pixel comprises:
a first pixel that is away from the third pixel by a first number of pixels along the first direction; and
a second pixel that is away from the third pixel by the first number of pixels along a third direction opposite to the first direction,
wherein the at least one second reference pixel comprises:
a fourth pixel that is away from the third pixel by a second number of pixels along the second direction; and
a fifth pixel that is away from the third pixel by the second number of pixels along a fourth direction opposite to the second direction,
wherein the image sensor picks up a second image of the projected second pattern image;
adjust, the projection position for each movement of the projection position, based on:
the first image and the second image that are overlapped;
a first comparison of a third output value of the at least one first reference pixel and the stored first reference value; and
a second comparison of a fourth output value of the at least one second reference pixel and the stored second reference value,
wherein the third output value and the fourth output value are acquired from the image sensor, based on:
the projection position that is moved in the multiples of the unit of the movement; and
the projection of the first pattern image that is stopped; and
control the screen to project the first image and the second image based on the adjusted projection position.

2. The information processing apparatus according to claim 1, wherein the first pattern image includes a checker pattern in which the bright section and the dark section are alternately arranged along the first and second directions.

3. The information processing apparatus according to claim 1, wherein the second pattern image and the first pattern image are same.

4. The information processing apparatus according to claim 1, wherein
a fifth output value of at least one of the first pixel or the second pixel is between a sixth output value of the bright section and a seventh output value of the dark section, and
an eighth output value of at least one of the fourth pixel or the fifth pixel is between the sixth output value of the bright section and the seventh output value of the dark section.

5. The information processing apparatus according to claim 1, wherein a moving direction of the projection position is such that:
a fifth output value of at least one of the first pixel or the second pixel is between a sixth output value of the bright section and a seventh output value of the dark section, and
an eighth output value of at least one of the fourth pixel or the fifth pixel is between the sixth output value of the bright section and the seventh output value of the dark section.

6. An information processing method, comprising:
in an information processing device:
acquiring an output value of each of a plurality of pixels of an image sensor, wherein each of the plurality of pixels has a same pixel size;
controlling a first projection apparatus to project, on a screen, a first pattern image that includes:
at least one first boundary between a bright section and a dark section, that extends in a first direction; and
at least one second boundary that extends in a second direction perpendicular to the first direction;
controlling a second projection apparatus to project, on the screen, a second pattern image with a distance smaller than the pixel size as a unit of movement of a projection position, wherein the image sensor has a first resolution that is smaller than each of a second resolution of the first projection apparatus and a third resolution of the second projection apparatus,
wherein the second pattern image includes:
at least one third boundary that corresponds to the at least one first boundary and extends in the first direction; and
at least one fourth boundary that corresponds to the at least one second boundary and extends in the second direction;
moving the projection position in multiples of the unit of the movement along at least one of the first direction or the second direction,
wherein the image sensor picks up a first image of the projected first pattern image;
storing as a first reference value, a first output value of at least one first reference pixel of the plurality of pixels that picks up a first sub-image of the at least one first boundary;
storing as a second reference value a second output value of at least one second reference pixel of the plurality of pixels that picks up a second sub-image of the at least one second boundary;
determining, an adjustment pixel from the plurality of pixels, as a third pixel that picks up a third sub-image of an adjustment point,
wherein the adjustment point is an intersection point of the at least one first boundary and the at least one second boundary,
wherein the at least one first reference pixel comprises:
a first pixel that is away from the third pixel by a first number of pixels along the first direction; and
a second pixel that is away from the third pixel by the first number of pixels along a third direction opposite to the first direction,
wherein the at least one second reference pixel comprises:
a fourth pixel that is away from the third pixel by a second number of pixels along the second direction; and
a fifth pixel that is away from the third pixel by the second number of pixels along a fourth direction opposite to the second direction,
wherein the image sensor picks up a second image of the projected second pattern image;
adjusting the projection position for each movement of the projection position, based on:
the first image and the second image that are overlapped;
a first comparison of a third output value of the at least one first reference pixel and the stored first reference value; and
a second comparison of a fourth output value of the at least one second reference pixel and the stored second reference value,
wherein the third output value and the fourth output value are acquired from the image sensor, based on:
the projection position that is moved in the multiples of the unit of the movement; and
the projection of the first pattern image that is stopped; and
controlling the screen to project the first image and the second image based on the adjusted projection position.

7. A non-transitory computer-readable medium having stored thereon, computer-executable instructions, which when executed by a computer, cause the computer to execute operations, the operations comprising:
acquiring an output value of each of a plurality of pixels of an image sensor, wherein each of the plurality of pixels has a same pixel size;
controlling a first projection apparatus to project, on a screen, a first pattern image that includes:
at least one first boundary between a bright section and a dark section, that extends in a first direction; and
at least one second boundary that extends in a second direction perpendicular to the first direction;
controlling a second projection apparatus to project, on the screen, a second pattern image with a distance smaller than the pixel size as a unit of movement of a projection position,
wherein the image sensor has a first resolution that is smaller than each of a second resolution of the first projection apparatus and a third resolution of the second projection apparatus,
wherein the second pattern image includes:
at least one third boundary that corresponds to the at least one first boundary and extends in the first direction; and
at least one fourth boundary that corresponds to the at least one second boundary and extends in the second direction;
moving the projection position in multiples of the unit of the movement along at least one of the first direction or the second direction,
wherein the image sensor picks up a first image of the first pattern image;
storing as a first reference value, a first output value of at least one first reference pixel of the plurality of pixels that picks up a first sub-image of the at least one first boundary;
storing as a second reference value a second output value of at least one second reference pixel of the plurality of pixels that picks up a second sub-image of the at least one second boundary;
determining, an adjustment pixel from the plurality of pixels, as a third pixel that picks up a third sub-image of an adjustment point,
wherein the adjustment point is an intersection point of the at least one first boundary and the at least one second boundary,
wherein the at least one first reference pixel comprises:
a first pixel that is away from the third pixel by a first number of pixels along the first direction; and
a second pixel that is away from the third pixel by the first number of pixels along a third direction opposite to the first direction,
wherein the at least one second reference pixel comprises:
a fourth pixel that is away from the third pixel by a second number of pixels along the second direction; and
a fifth pixel that is away from the third pixel by the second number of pixels along a fourth direction opposite to the second direction,
wherein the image sensor picks up a second image of the projected second pattern image;
adjusting the projection position for each movement of the projection position, based on:
the first image and the second image that are overlapped;

a first comparison of a third output value of the at least one first reference pixel and the stored first reference value; and a second comparison of a fourth output value of the at least one second reference pixel and the stored second reference value, wherein the third output value and the fourth output value are acquired from the image sensor, based on:
the projection position that is moved in the multiples of the unit of the movement; and
the projection of the first pattern image that is stopped; and controlling the screen to project the first image and the second image based on the adjusted projection position.

8. An adjustment apparatus, comprising:
an image sensor including a plurality of pixels, wherein each of the plurality of pixels has a same pixel size; and
circuitry configured to:
control a first projection apparatus to project, on a screen, a first pattern image that includes:
at least one first boundary between a bright section and a dark section, that extends in a first direction; and
at least one second boundary that extends in a second direction perpendicular to the first direction;
control a second projection apparatus to project, on the screen, a second pattern image with a distance smaller than the pixel size as a unit of movement of a projection position,
wherein the image sensor has a first resolution that is smaller than each of a second resolution of the first projection apparatus and a third resolution of the second projection apparatus,
wherein the second pattern image includes: at least one third boundary that corresponds to the at least one first boundary and extends in the first direction; and
at least one fourth boundary that corresponds to the at least one second boundary and extends in the second direction;
move the projection position in multiples of the unit of movement along at least one of the first direction or the second direction,
wherein the image sensor is further configured to pick up a first image of the projected first pattern image;
store as a first reference value, a first output value of at least one first reference pixel of the plurality of pixels that picks up a first sub-image of the at least one first boundary;
store as a second reference value, a second output value of at least one second reference pixel of the plurality of pixels that picks up a second sub-image of the at least one second boundary;
determine, an adjustment pixel from the plurality of pixels, as a third pixel that picks up a third sub-image of an adjustment point,
wherein the adjustment point is an intersection point of the at least one first boundary and the at least one second boundary,
wherein the at least one first reference pixel comprises:
a first pixel that is away from the third pixel by a first number of pixels along the first direction; and
a second pixel that is away from the third pixel by the first number of pixels along a third direction opposite to the first direction,
wherein the at least one second reference pixel comprises:

a fourth pixel that is away from the third pixel by a second number of pixels along the second direction; and
a fifth pixel that is away from the third pixel by the second number of pixels along a fourth direction opposite to the second direction, wherein the image sensor picks up a second image of the projected second pattern image;

adjust the projection position for each movement of the projection position, based on:
the first image and the second image that are overlapped;
a first comparison of a third output value of the at least one first reference pixel and the stored first reference value; and
a second comparison of a fourth output value of the at least one second reference pixel and the stored second reference value,
wherein the third output value and the fourth output value are acquired from the image sensor, based on:
the projection position that is moved in the multiples of the unit of the movement; and
the projection of the first pattern image that is stopped; and control the screen to project the first image and the second image based on the adjusted projection position.

9. An image display system, comprising:
a projection assembly including a first projection apparatus and a second projection apparatus;
an image sensor including a plurality of pixels, wherein each of the plurality of pixels has a same pixel size; and
circuitry configured to:
control the first projection apparatus to project, on a screen, a first pattern image that includes:
at least one first boundary between a bright section and a dark section that extends in a first direction; and
at least one second boundary that extends in a second direction perpendicular to the first direction;
control the second projection apparatus to project, on the screen, a second pattern image with a distance smaller than the pixel size as a unit of movement of a projection position,
wherein the image sensor has a first resolution that is smaller than each of a second resolution of the first projection apparatus and a third resolution of the second projection apparatus,
wherein the second pattern image includes: at least one third boundary that corresponds to the at least one first boundary and extends in the first direction; and
at least one fourth boundary that corresponds to the at least one second boundary and extends in the second direction;
move the projection position in multiples of the unit of movement along at least one of the first direction or the second direction,
wherein the image sensor is further configured to pick up a first image of the first pattern image;
store as a first reference value, a first output value of at least one first reference pixel of the plurality of pixels that picks up a first sub-image of the at least one first boundary;
store as a second reference value, a second output value of at least one second reference pixel of the plurality of pixels that picks up a second sub-image of the at least one second boundary;

determine, an adjustment pixel from the plurality of pixels, as a third pixel that picks up a third sub-image of an adjustment point,
wherein the adjustment point is an intersection point of the at least one first boundary and the at least one second boundary,
wherein the at least one first reference pixel comprises:
  a first pixel that is away from the third pixel by a first number of pixels along the first direction; and
  a second pixel that is away from the third pixel by the first number of pixels along a third direction opposite to the first direction, wherein the at least one second reference pixel comprises:
  a fourth pixel that is away from the third pixel by a second number of pixels along the second direction; and
  a fifth pixel that is away from the third pixel by the second number of pixels along a fourth direction opposite to the second direction,
wherein the image sensor is further configured to pick up a second image of the projected second pattern image;
adjust the projection position for each movement of the projection position, based on:
  the first image and the second image that are overlapped;
  a first comparison of a third output value of the at least one first reference pixel and the stored first reference value; and
  a second comparison of a fourth output value of the at least one second reference pixel and the stored second reference value,
  wherein the third output value and the fourth output value are acquired from the image sensor, based on:
    the projection position that is moved in the multiples of the unit of the movement; and
  the projection of the first pattern image that is stopped; and
control the screen to project the first image and the second image based on the adjusted projection position.

* * * * *